US012266340B2

(12) United States Patent
Austraat

(10) Patent No.: US 12,266,340 B2
(45) Date of Patent: Apr. 1, 2025

(54) ADAPTIVE, INDIVIDUALIZED, AND CONTEXTUALIZED TEXT-TO-SPEECH SYSTEMS AND METHODS

(71) Applicant: Truist Bank, Charlotte, NC (US)

(72) Inventor: Bjorn Austraat, New York, NY (US)

(73) Assignee: TRUIST BANK, Charlotte, NC (US)

( * ) Notice: Subject to any disclaimer, the term of this patent is extended or adjusted under 35 U.S.C. 154(b) by 253 days.

(21) Appl. No.: 18/062,630

(22) Filed: Dec. 7, 2022

(65) Prior Publication Data

US 2024/0194178 A1    Jun. 13, 2024

(51) Int. Cl.
*G10L 13/027*  (2013.01)
*G10L 15/16*   (2006.01)
*G10L 15/18*   (2013.01)
*G10L 13/00*   (2006.01)

(52) U.S. Cl.
CPC .......... *G10L 13/027* (2013.01); *G10L 15/16* (2013.01); *G10L 15/1815* (2013.01); *G10L 13/00* (2013.01)

(58) Field of Classification Search
CPC ..... G06F 16/3329; G10L 13/00; G10L 13/02; G10L 13/04; G10L 13/10; G10L 15/26
See application file for complete search history.

(56) References Cited

U.S. PATENT DOCUMENTS

| | | | |
|---|---|---|---|
| 10,276,149 B1 * | 4/2019 | Liang | G10L 13/033 |
| 10,373,605 B2 * | 8/2019 | Reber | G06F 18/10 |
| 2008/0195391 A1 * | 8/2008 | Marple | G10L 13/06 |
| | | | 704/260 |
| 2015/0206544 A1 * | 7/2015 | Carter | G10L 15/04 |
| | | | 704/235 |

(Continued)

FOREIGN PATENT DOCUMENTS

WO   WO-2006123539 A1 * 11/2006 ........... G10L 13/033

OTHER PUBLICATIONS

Williams, et al., "Comparison of Speech Representations for Automatic Quality Estimation in Multi-Speaker Text-to-Speech Synthesis," arXiv 2020. (Year: 2020).*

(Continued)

*Primary Examiner* — Feng-Tzer Tzeng
(74) *Attorney, Agent, or Firm* — Michael A. Springs, Esq.; Shumaker, Loop & Kendrick, LLP; Patrick B. Horne

(57) ABSTRACT

Systems and methods receive, in real-time from a user via a user device, input audio data comprising communication element(s) and trained model(s) are applied thereto to categorize the communication element(s), the categorizing comprising assigning a contextual category to a communication element. Text is generated that includes a response to the communication element(s), the response including individualized and contextualized qualities predicted to provide an optimal outcome based on (i) the assigned contextual category and (ii) the user. Text-to-speech processing of the text is implemented to produce an audio output comprising (a) the response and (b) a speech pattern predicted to facilitate the optimal outcome. The audio output is provided to the user via the user device, and based thereon a user's reaction is measured according to a quantifiable quality score that is used to modify future iterations of text-to-speech processing to provide future audio output(s) including a revised speech pattern.

18 Claims, 10 Drawing Sheets

(56) References Cited

U.S. PATENT DOCUMENTS

2021/0240776 A1* 8/2021 Jawagal ................ G06N 3/049
2023/0317057 A1* 10/2023 Mirzoyan ............. G06F 40/143
                                                          704/235

OTHER PUBLICATIONS

Williams, et al., "Comparison of Speech Representations for Automatic Quality Estimation in Multi-Speaker Text-to-Speech Synthesis," arXiv 2020 (see attached reference in the first Office action). (Year: 2020).*

Zhang, W., Liu, F., Zhou, L., Wang, W., Jiang, H. and Jiang, C.; (2019) The effects of timbre on neural responses to musical emotion; https://centaur.reading.ac.uk/85954/, 34 pages.

* cited by examiner

ADAPTIVE, INDIVIDUALIZED, AND CONTEXTUALIZED TEXT-TO-SPEECH SYSTEMS AND METHODS

FIELD OF THE INVENTION

This invention relates generally to the field of text-to-speech processing, and more particularly embodiments of the invention relate to adaptive, individualized, and contextualized text-to-speech systems and methods.

BACKGROUND OF THE INVENTION

Computing systems commonly use various technologies to understand text and spoken words using natural language processing (NLP), which is a subfield of artificial intelligence. A subfield of artificial intelligence and computational linguistics that is used to enable computers to derive meaning from a text input is natural language understanding (NLU) and a subfield of artificial intelligence and computational linguistics that is used to produce a natural language output based on some data input (such as that provided from text and spoken words) is natural language generation (NLG) technology. Text-to-speech (TTS) engines incorporate assistive technology that artificially produce human speech using a speech synthesizer that converts normal language text into speech. Each of these technologies are utilized by computing systems to communicate and interact with users. However, there is an ever-growing need in the art for improved communication technologies.

One limitation associated with existing communication technologies that are utilized by computing systems is that users with diverse needs and situations often utilize these technologies. Many nuances to language are used by each user, which can make it difficult for the computing system to respond appropriately to various user inputs. One example nuance that can be difficult to detect is sarcasm, where the manner in which the words are said may alter the meaning of the words. Various other nuances can impact a user's interaction with the computing system that implement these existing communication technologies, and in many instances the user's interaction can affect the user's perception of the company that implements these communication technologies. Companies that utilize these technologies to interact with customers that call in to receive customer service may put a particular emphasis on developing improved technological advancements in these technological areas in order to provide these customers with a positive experience.

Thus, a need exists for improved systems and methods that provide adaptive, individualized, and contextualized customer experiences.

BRIEF SUMMARY

Shortcomings of the prior art are overcome and additional advantages are provided through the provision of a computing system for adaptive, individualized, and contextualized text-to-speech. The system includes, for instance, a memory, one or more processors in communication with the memory, and program instructions executable by the one or more processors via the memory. The program instructions are executable to, in part, receive, in real-time from a user via a user device, input audio data comprising a plurality of communication elements. Further, the program instructions are executable to, in part, apply the input audio data to at least one trained model to categorize one or more communication elements of the plurality of communication elements, the categorizing including assigning at least one contextual category to a communication element of the plurality of communication elements. Additionally, the program instructions are executable to, in part, generate text comprising a response to one or more of the plurality of communication elements, the response including one or more individualized and contextualized qualities predicted to provide an optimal outcome based at least in part on (i) the assigned at least one contextual category and (ii) the user from which the input audio data is received. Text-to-speech processing of the generated text is also implemented, where the text-to-speech processing produces an audio output comprising (a) the response and (b) a speech pattern predicted to facilitate the optimal outcome. The program instructions are also executable to, in part, provide, to the user via the user device, the audio output and based thereon measure a reaction of the user in response to the speech pattern of the audio output according to a quantifiable quality score and using the quantifiable quality score to modify future iterations of the text-to-speech processing in order to provide one or more future audio outputs comprising a revised speech pattern.

Additionally, disclosed herein is a computing system for adaptive, individualized, and contextualized text-to-speech. The system includes, for instance, a memory, one or more processors in communication with the memory, and program instructions executable by the one or more processors via the memory. The program instructions are executable to, in part, receive, during a single interaction between the user and the computing system, an initial audio input provided via a user device by a user, and to classify a context of the audio input, the context indicating a purpose for receiving the audio input. The program instructions are further executable to, in part, identify a saved speech pattern profile corresponding to a highest level of positive resolutions resulting from previously received audio having similarly classified contexts to the context of the received audio input, and to provide, using text-to-speech processing, an audible output to the user via the user device, the audible output incorporating a speech pattern of the saved speech pattern profile. The program instructions are also executable to, in part, modify the speech pattern in response to subsequent audio inputs provided by the user, the modifying occurring in real time during the single interaction between the user and the computing system.

Also disclosed herein is a computer-implemented method for adaptive, individualized, and contextualized text-to-speech. The computer-implemented method includes, in part, receiving, in real-time from a user via a user device, input audio data comprising a plurality of communication elements, and performing natural language processing on the input audio data. Further, the method includes, in part, applying the input audio data to at least one trained model to categorize one or more communication elements of the plurality of communication elements, the categorizing including assigning at least one contextual category to a communication element of the plurality of communication elements. The method also includes, in part, generating text comprising a response to one or more of the plurality of communication elements, the response including one or more individualized and contextualized qualities predicted to provide an optimal outcome based at least in part on (i) the assigned at least one contextual category and (ii) the user from which the input audio data is received. Additionally, the method includes, in part, implementing text-to-speech processing of the generated text, the text-to-speech processing producing an audio output comprising (a) the response and (b) a speech pattern predicted to facilitate the optimal outcome. The audio output is also provided to the user via the user device and based thereon measure a reaction of the user in response to the speech pattern of the audio output according to a quantifiable quality score and using the quantifiable quality score to modify future iterations of the text-to-speech processing in order to provide one or more future audio outputs comprising a revised speech pattern.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
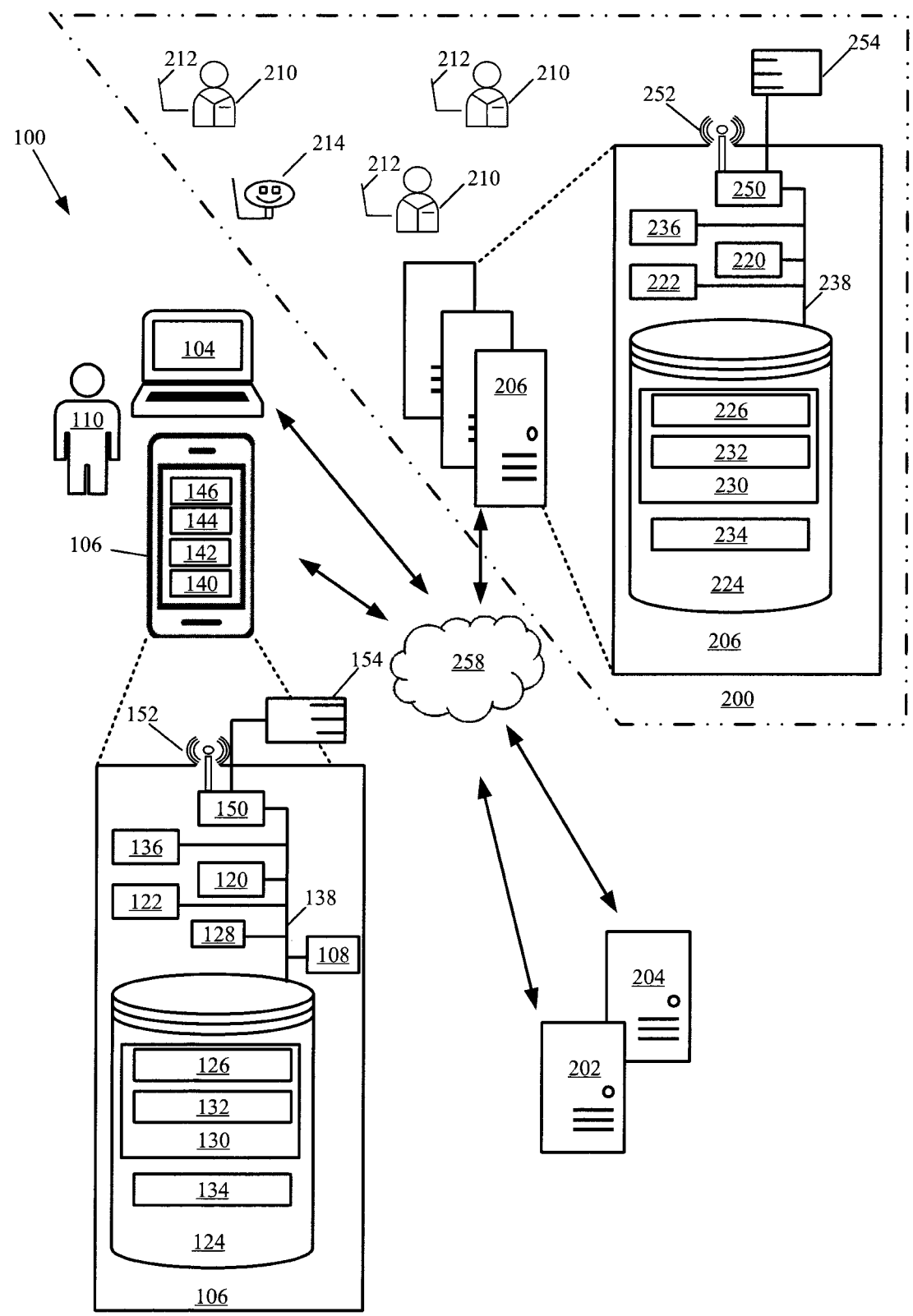
FIG. 1 illustrates an enterprise system, and environment thereof for adaptive, individualized, and contextualized text-to-speech, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise that hosts, maintains, or uses the disclosed systems and methods. The term provider generally describes a person or business enterprise providing goods or services. Interactions between a provider and its customers or users, can be implemented as an interaction between a computing system of the provider and a user device of the customer. Each interaction may produce interaction data through the exchange of verbal or written communication that is converted to and stored as interaction data files. Example interactions may include, for example, intake calls that a user or customer makes to a customer service department of the enterprise, and/or interactions with virtual assistant device such as a smart speaker or other smart home device (e.g., an Amazon Echo® device) that is controlled via voice inputs.

As used herein, the term "customer service" may include various support services that incorporate customer interactions including, helpdesk requests, call centers, human agents, and/or computerized support agents. The term "agent" generally describes any person or machine that interfaces with a customer to provide services using the systems and methods described herein. The terms "customer" and "user" may be used interchangeably and may represent any individual to whom the provider is rendering goods or services, any individual with whom the provider has an ongoing relationship, any individual attempting to contact the provider via a communication means including telephonic communication means, text, email, video chat, an instant message software application, or voice inputs.

Disclosed systems and methods provide adaptive, individualized, and contextualized text-to-speech processes in part by incorporating natural language processing (NLP) technology, artificial intelligence, natural language generation (NLG) technology, and text-to-speech (TTS) engines. Input audio data is analyzed using NLP techniques and artificial intelligence technology can be used to identify the user providing the input audio data, a purpose for why the user is contacting the enterprise (e.g., using a list of subjects addressed within the input audio data to identify the reason(s) or purpose for why a customer initiated an interaction), the importance of certain aspects of the interaction, and various other communication elements.

Various embodiments described herein are in reference to utilizing the disclosed systems and methods in a call center environment where the user calls the enterprise and thereby initiates an interaction with the computing system. However, those of ordinary skill in the art will appreciate that the disclosed systems and methods are not limited to use in a call center environment or in the performance of customer service activities. The systems and methods described herein are generally applicable in other contexts where a user interacts with a computing system. Another example interaction may include an interaction with virtual assistant device such as a smart speaker or other smart home device that is controlled via voice inputs.

FIG. 1 illustrates a computing system 100 and environment thereof, according to at least one embodiment. The computing environment generally includes a user 110 that benefits through use of services and products offered by a provider through an enterprise system 200. The computing environment may include, for example, a distributed cloud computing environment (private cloud, public cloud, community cloud, and/or hybrid cloud), an on-premise environment, fog-computing environment, and/or an edge-computing environment. The user 110 accesses services and products by use of one or more user devices 104, 106. Example user devices 104, 106 may include a laptop, desktop computer, and/or a mobile computing device such as a smart phone, a portable digital assistant (PDA), a pager, a mobile television, a gaming device, a camera, a video recorder, an audio/video player, radio, a GPS device, a virtual assistant device such as a smart speaker or other smart home device, or any combination of the aforementioned, or other portable device with processing and communication capabilities. According to various embodiments, the one or more user devices may also include any telephonic communication means that the user 110 may utilize to communicate with the enterprise system 200. Such telephonic communications means may include any transfer of the human voice, real or synthesized, in whole or in part by any means through the use of facilities for the transmission of communications by the aid of wire, cable, wireless, or other connection between the point of origin and the point of reception where the point of origin includes any user device (such as mobile device 106) and the point of reception includes any receiver or other communication interface 250 of the enterprise system 200.

In the illustrated example, the mobile device 106 is illustrated in FIG. 1 as having exemplary elements, the below descriptions of which apply as well to the computing device 104. The one or more user devices 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system used on personal computers, central computing systems, phones, and other devices.

The user 110 can be an individual, a group, or any entity in possession of or having access to the user device 104, 106, which may be personal or public items. Although the user 110 may be singly represented in some figures, in at least in some embodiments the user 110 is one of many such that a market or community of users, consumers, customers, business entities, government entities, clubs, and groups of any size.

The user device, as illustrated with reference to the mobile device 106, includes components such as, at least one of each of a processor 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, or required or related to any or all of the applications or programs 130.

The memory device 122 is operatively coupled to the processor 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. The GUI display screens may include features for displaying information and accepting inputs from users, such as text boxes, data fields, hyperlinks, pull down menus, check boxes, radio buttons, and the like.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, Global Positioning System (GPS) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. According to one embodiment, agent-assisted automation may be utilized to communicate with the user 110 without human intervention. Such agent-assisted automation may incorporate NLP techniques, natural language generation (NLG) technology, and text-to-speech (TTS) engines. In at least some examples, any number of human agents 210 can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230. In one non-limiting example, the computing system 206 may include applications or programs 230 that incorporate software that provides speech recognition or NLP, NLG technology, and/or text-to-speech technology.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMAX, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), personal area networks (PANs), WLANs, campus area network (CAN), metropolitan area network (MAN), storage-area network (SAN), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The network 258 may also include various telecommunications networks such as a telephone network that allows telephone calls between the user 110 and the enterprise system 200. Example telephone networks may include a landline network, a wireless network, an integrated services digital network, and/or a private network.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent remote terminal(s) utilized by the enterprise system 200 in serving users. For instance, the external systems 202, 204 may represent automatic teller machines (ATMs). In another example, the external systems 202 and 204 represent electronic systems for processing payment transactions payment such as, for instance, clearinghouse or payment rail systems. In another example, the external systems 202 and 204 represent third party systems such as merchant systems configured to interact with the user device 106 during transactions and also configured to interact with the enterprise system 200 in back-end transactions clearing processes. According to various embodiments, external systems 202 and 204 may utilize software applications that function using external resources that are available through a third-party provider such as SaaS, PaaS, or IaaS service models.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud-computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

The enterprise system 200 can be configured to generate data manually or to obtain data from a third party source such as, for example, a cloud storage service or remote database. Such data that may be generated, downloaded, or otherwise obtained may include, for example, audio data or alphanumeric text data representing written communications. In one particular example, the enterprise system 200 may obtain audio data and/or alphanumeric text data from prior chats, telephone calls, or other interactions with a user 110. Further, the enterprise system 200 may also generate text and/or provide an audio output of real time conversations.

In one example, a virtual agent 214 or one or more human agents 210 may access third party systems using a software application compatible with the third party system that can be integrated with the virtual agent 214 and/or agent computing device 212 such as, for example, an integrated mobile software application or an application programming interface (API) software application that facilitates communication between software and systems by mapping computer-readable commands and data formats between systems. In another embodiment, the virtual agent 214 and/or agent computing device 212 access the third party system using a web browser application software to access a web-based software interface (e.g., a website).

According to one embodiment, a user 110 may initiate an interaction with the enterprise system 200 using a telephone or written electronic communication (e.g., email, SMS text message, an instant chat message, a social media message, etc.). The enterprise system can obtain data provided via the telephone or written electronic communication by recording or transcribing telephonic communications between the user 110 and the virtual agent 214 and/or one or more human agents 210. Captured audio data may be stored to the storage device 224 or to a third party storage resource such as, for example, a cloud storage service or remote database. According to one example, input audio data may be transcribed using various speech-to-text techniques such as NLP. Such NLP may, according to one or more embodiments, utilize third-party software (e.g., Amazon Comprehend®, IBM® Watson Assistant, etc.). Once the input audio data is transcribed, the transcribed data may be stored to the storage device 224 and/or the third party storage resource (e.g., cloud storage service or remote database).

The input audio data and/or transcribed data may be stored to a relational database that maintains the input audio data, transcribed data and/or various other user or content data in a manner that permits the content of such data to be associated with certain information such as, for example, the user 110, a purpose for why the user 110 initiated the interaction with the enterprise system 200, or various other identifiers or content metadata. Storing such input audio data and/or transcribed data to a relational database further facilitates expedient sorting of the data, such as retrieving user or content data having certain subject matter, customers, times and dates, etc. The enterprise system 200 may maintain the interaction or relational database that stores such data in order to access this data in future user interactions. Metadata that can be accessed by the enterprise system 200 may include, for example, (a) sequencing data representing the date and time when the data was created or otherwise representing an order or sequence in which user interaction occurred, (b) subject identifier data that characterizes the purpose (e.g., subjects or topics) for the user interaction (e.g., "technical support," "make changes to user account," "make a payment," etc.), (c) weighting data representing the relative importance of various qualities or speech patterns (e.g., timbre, tone, cadence, etc.) specific to the user 110 based on the interaction between the user 110 and the enterprise system 200 having a desired resolution or outcome, where the success of certain qualities being based on user responses, customer feedback, agent feedback, etc., (d) source identifier data identifying the user 110 such as, for example, a name of the user, an affiliated employer or business, a job title or role, etc., (e) provider identifier data identifying the owner of the data (e.g., the entity that operates the enterprise system 200), (f) user source data such as a telephone number, email address, user device internet protocol (IP) address, (g) sentiment data including sentiment identifiers (e.g., how the user 110 responds or feels in relation to certain communication elements or qualities that take place during a user interaction with the enterprise system 200), (h) polarity data indicating the relative positive or negative degree of sentiment occurring during a user interaction, (i) resolution data indicating whether a particular user's issue was resolved or not, and if resolved how the issue was resolved (e.g., if the issue is that the user forgot a password and the resolution was that the password was reset), (j) agent identifier data identifying a human agent 210 or whether the virtual agent 214 interacted with the user 110 in the past, and/or (k) other types of data that can be helpful for future user interactions between various users and the enterprise system 200.

Some user interactions between the user 110 and the enterprise system 200 may be initiated when a user contacts a provider through an incoming interaction request. The incoming interaction request may include, according to various examples, a phone call that includes input audio data, a chat or an email providing incoming interaction initialization data, which can be multi-frequency signal tones or data packets representing a user device IP address, email address, or digital routing information, or even a video call, which may incorporate input audio data as well as input video data. Once the user interaction is initiated, the enterprise system 200 may include a source identification software service that processes incoming interaction initiation data to generate user source data (e.g., a telephone number, a user device IP address, an email address, a user account name, etc.).

The source identification software service determines the telephone number of the incoming call source as incoming telephone number data using techniques that can include, for example, automatic number identification ("ANI"). In that case, the incoming interaction initialization data can be ANI data, which is generally transmitted along with an incoming telephone call using multi-frequency signaling, which can be a digital tone that is translated to a numeric value. For Voice-over-Internet Protocol ("VoIP") calling, the incoming telephone number can instead be received as packets of digital information within the incoming interaction initialization data. The source identification software service processes the incoming interaction initialization data (i.e., the ANI data or IP data packets) to determine the source data as incoming telephone number data. The provider system uses the incoming telephone number data to query an internal end user database, such as storage device 224, to determine whether the incoming telephone number corresponds to an existing provider customer.

When a user initiates a provider-user interaction by communicating with a provider through written electronic communications or VOIP, the communications originate from a user computing device, such as a personal computer, a smart phone, or tablet computing device. In that instance, the source identification software service processes the incoming initialization data to capture or determine user source data that can include a user device IP address for the user computing device, an email address, or a social media or other account name.

The enterprise system 200 may utilize the user source data to transmit a query to the provider's internal end user database to determine if an existing database record matches user source data. In this manner, either the incoming telephone number, the user device IP address, email address, or other user source data is used to determine to identity of the end user and whether the user is a current or former provider customer.

The end user database may comprise database records that correspond to individual customers, or end users. The end user database records may store a variety of end user data, including, without limitation: (i) a user identifier; (ii) user contact data, including a mailing address or a geographic region where the user resides (e.g., a zip code, city, state); (iii) user source data, such as user telephone number data, user device IP Address data, an email address, or a social media account name; (iv) user demographic data, including the gender, age, and/or regional dialect of a user; (v) one or more product identifiers that indicate the accounts or products currently held by a user (e.g., a checking account, a home loan, brokerage account, etc.); (vi) user resource availability data (e.g., balances for various product types or account types associated with, or held by, a user); (vii) average resource availability data that indicates the average value of products or account balances maintained by the user over a given time period (e.g., an average monthly balance for a financial/bank account held by the user); (viii) transaction data that includes data and information relating to user transactions, such as payment amounts, dates when a transaction occurred, data that identifies other parties to the transaction (i.e., a payment recipient), and information identifying a category of expenditures for the transaction (i.e., groceries, transportation, etc.); (ix) average resource utilization volume data indicating the average number of transactions a user conducts using a given product over a given time period (e.g., the number of resource expenditures per month for a given account or accounts); (x) user online activity data indicating user attempts to log into the provider system to access user accounts or other activities performed by users online or through a dedicated mobile device software application; or (xi) system configuration data, as described herein.

According to various embodiments, the end user database can also include interaction activity data that in part overlaps with data stored to the Interaction Database. That is, the interaction activity data represents information characterizing prior shared experiences between the particular user and the provider, such as a history of user calls to a provider seeking technical support assistance. In particular, the interaction activity data can include, without limitation: (i) sequencing data; (ii) subject identifier data; (iii) interaction driver identifier data; (iv) sentiment data; (v) polarity data; (vi) user source data (e.g., did the user utilize a telephone, email, or other means to initiate the interaction); (vii) an agent identifier; and (viii) resolution data.

The enterprise system 200 can further determine geographic location data based on the incoming telephone number data or user device IP address. The provider system can include a software application that transmits the incoming telephone number data or the user device IP address to an Identity & Location API that utilizes the phone number or IP Address to determine the approximate geographic location of the user computing device. The Identity & Location API can pass the incoming telephone number or user device IP address to a database or a third-party software service that returns geographic location data corresponding to an approximate geographic location for the telephone number or the user device IP address, such as a city, county, or state. The Identity & Location API stores the geographic data to a database record with user data and/or content data.

When a user 110 accesses the enterprise system 200 through a user computing device 104, 106, the enterprise system 200 can capture additional elements of end user data. For instance, end user data is captured when a user computing device is used to access the provider system to request data to be displayed on the user computing device. Alternatively, end user data is captured when a telephone is used to interact with a virtual agent 214 or human agent 210 of the enterprise system 200.

User computing devices access the provider system using an Internet browser software application to access the web server to display a provider webpage. Alternatively, user computing devices access the provider system through a provider mobile software application that displays GUI screens. In accessing the provider system, the user computing device transmits a user-interface-transmit command to the web server that can include: (i) the device IP address for the user computing device, (ii) navigation data, and (iii) system configuration data. In response to the user interface transmit command, the web server returns provider display data and a digital cookie that is stored to the user computing device and used to track functions and activities performed by the user computing device. After receiving provider display data, the user computing device processes the display data and renders GUI screens presented to users, such as a provider website or a GUI within a provider mobile software application. Note that in some embodiments, the navigation data and system configuration data may be sent to the enterprise system 200 in a separate message subsequent to the user interface transmit command message.

In various embodiments, the enterprise system 200 may further determine user demographic data such as, for example, gender, approximate age range, and/or regional dialect of the user 110 based on input audio data spoken by the user 110. For instance, the enterprise system 200 may apply the input audio data to a trained model, such as the artificial intelligence system or various models that incorporate machine-learning algorithms in order to categorize one or more communication elements of the input audio data spoken by the user 110.

The user computing device 104, 106 may also transmit system configuration data to the enterprise system 200 that is used to evaluate a user or authenticate the user computing device 104, 106. System configuration data can include, without limitation: (i) a unique identifier for the user computing device (e.g., a media access control (MAC) address hardcoded into a communication subsystem of the user agent computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and ascertaining the subject identifiers underlying a support request or user communication.

With respect to the agent attribute data, the provider system can include, for example, an Agent Identity Management Service (Agent IdM) software application that stores and captures a variety of information relating to provider agents such as human agents 210. Agent attribute data can include, without limitation: (i) an agent login username, which is a username the agent entered to log into the end user computing device; (ii) an agent identifier, such as an employee number or name, that identifies the agent and that is independent of the software applications or computing devices being utilized; (iii) the agent computing device Internet Protocol address ("IP Address"); (iv) agent service line identifier data indicating a provider department, branch, or division to which an agent is assigned; (v) an agent role designation (e.g., junior agent, senior agent, supervisor, etc.); (vi) agent location data for the agent computing device indicating, for example, a geographic location where the agent computing device is located or a residential address for the agent; (vii) agent experience data indicating the duration of professional experience an agent has in one or more relevant roles or in working for a provider (e.g., 2 years' experience in new account creation or 5 years and 2 months working for the provider overall); and (vii) agent training data indicating particular certifications, products, or services that an agent is trained to handle (e.g., an agent is qualified to provide technical support for a provider mobile application, or the agent is qualified to offer advice concerning a particular product or service).

A content driver software service processes content data to identify purposes, topics, and subjects addressed within the content data, user data that includes source identifiers (e.g., names of conversation participants), sentiment data, and weighting data indicating the relative importance of subjects, content sources, and interrogatories. The data and information generated by the content driver software service can output to GUIs that make the content data more accessible to provider personnel and that reveal analytical insights that can be used to identify and resolve potential problems or design and implement system enhancements. The content driver software service can be implemented by a separate, dedicated computing device, or implemented as an integrated software application running on a computing device that is also running other applications (e.g., a network server).

As discussed below, a content driver software service processes the content data using a subject classification analysis to determine one or more subject identifiers that represent topics addressed within the content data. Non-limiting examples can be subject identifiers relating to a particular provider product or service.

According to various embodiments, input audio data may be processed using a content driver software service that processes various data using NLP technology that is implemented by one or more artificial intelligence software applications and/or systems. The artificial intelligence software applications and/or systems may be implemented, according to various embodiments, neural networks. NLP technology analyzes one or more content data files (e.g., audio files) that include various communication elements such as (a) alpha-numeric data composed of individual words, symbols, numbers, (b) vocal qualities or speech patterns (e.g., tone, timbre, cadence, accents/emphasis on syllables, volume, etc., (c) stylistic communication approaches (e.g., abbreviations, acronyms, etc.), and/or (d) various other communication elements that provide meaningful communicative features.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine-learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine-learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine-learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine-learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

Natural language processing software techniques may be implemented using the described machine learning models such as unsupervised learning techniques that identify and characterize hidden structures of unlabeled content data, or supervised techniques that operate on labeled content data and include instructions informing the system which outputs are related to specific input values.

In such instances, supervised software processing can rely on iterative training techniques and training data to configure neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

Supervised learning software systems are trained using content data that is well-labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance, but this excellent level of performance requires labeled data to be available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together, which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data.

Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

Clustering software techniques can automatically group semantically similar user utterances together to accelerate the derivation and verification of an underneath common user intent—i.e., ascertain or derive a new classification or subject, and not just classification into an existing subject or classification. Unsupervised learning software systems are also used for association rules mining to discover relationships between features from content data. At times, unsupervised learning software systems can be less accurate than well-trained supervised systems.

The content driver software service utilizes one or more supervised or unsupervised software processing techniques to perform a subject classification analysis to generate subject data. Suitable software processing techniques can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together, which then give insights into the subjects of those words and documents. The content driver software service can utilize software processing techniques that include Non-Matrix Factorization, Correlated Topic Model ("CTM"), and K-Means or other types of clustering.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks are trained using training set content data that comprise sample tokens, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data is then fed to the content driver software service neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

Neural networks may perform a supervised learning process where known inputs and known outputs are utilized to categorize, classify, or predict a quality of a future input. However, additional or alternative embodiments of the machine-learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine-learning algorithm may adjust the weight coefficients until any error in the output data generated by the algorithm is less than a predetermined, acceptable level. For instance, the training process may include comparing the generated output, produced by the network in response to the training data, with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine-learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user, and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis.

Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the reduced content data is vectorized to map the alphanumeric text into a vector form. One approach to vectorizing content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

Techniques to encode the context communication elements (e.g., such as words, speech patterns, tone, timbre, cadence, etc.) may, in part, determine how often communication elements appear together. Determining the adjacent pairing of communication elements can be achieved by creating a co-occurrence matrix with the value of each member of the matrix counting how frequently one communication element coincides with another, either just before or just after it. That is, the words or communication elements form the row and column labels of a matrix, and a numeric value appears in matrix elements that correspond to a row and column label for communication elements that appear adjacent in the content data.

As an alternative to counting communication elements (e.g., words) in a corpus of content data and turning it into a co-occurrence matrix, another software processing technique may be used where a communication element in the content data corpus predicts the next communication element. Looking through a corpus, counts may be generated for adjacent communication elements, and the counts are converted from frequencies into probabilities (i.e., using n-gram predictions with Kneser-Ney smoothing) using a simple neural network. Suitable neural network architectures for such purpose include a skip-gram architecture. The neural network may be trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a uniform manifold approximation and projection algorithm ("UMAP") can be applied to reduce dimensionality while maintaining essential information.

Prior to conducting a subject analysis to ascertain subjects identifiers in the content data (i.e., topics or subjects addressed in the content data) or interaction driver identifiers in the content data (i.e., reasons why the customer initiated the interaction with the provider, such as the reason underlying a support request), the system can perform a concentration analysis on the content data. The concentration analysis concentrates, or increases the density of, the content data by identifying and retaining communication elements that have significant weight in the subject analysis and discarding or ignoring communication elements that have relativity little weight.

In one embodiment, the concentration analysis includes executing a term frequency-inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The concentrated content data is processed using a subject classification analysis to determine subject identifiers (i.e., topics) addressed within the content data. The subject classification analysis can specifically identify one or more interaction driver identifiers that are the reason why a user initiated a shared experience or support service request. An interaction driver identifier can be determined by, for example, first determining the subject identifiers having the highest weight quantifiers (e.g., frequencies or probabilities) and comparing such subject identifiers against a database of known interaction driver identifiers. To illustrate, the subject identifiers from a shared experience having the five (5) highest frequencies or probabilities might include "forgot password," "report fraud," "the weather," "children," and "covid-19." The provider system compares the top five subject identifiers against a list of known interaction driver identifiers that includes "forgot password" and "report fraud" as a known support driver but not "weather," "children," and "covid-19." In that instance, the provider system identifiers the two support drivers as being "forgot password" and "report fraud."

In one embodiment, the subject classification analysis is performed on the content data using a Latent Drichlet Allocation analysis to identify subject data that includes one or more subject identifiers (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (i.e., keywords, phrases, symbols, etc.) within the content data as well as a frequency of the one or more communication elements within the content data. The content driver software service can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used). In one embodiment, the descriptor sets were analyzed to determine if the reasons driving a customer support request were identified by the descriptor set subject identifiers.

The software model was evaluated according to three categories, including a "good match" where the support request reason(s) were identified by the top words in the subject vector (i.e., the words with the highest weight or frequency), a "moderate" match where the support request reason(s) were identified by the second tier of words in the subject vector (i.e., words six to ten), and a "poor" match where, for instance, the top words in a subject vector did not match or identify the reasons the support request was initiated.

Research to evaluate the model showed that for 70% of the clusters, the support request drivers or subject identifiers were properly identified by the top words within a subject vector set of words (i.e., a good match), and for 13% of the clusters, the support request drivers were identified as a moderate match to words within the subject vectors. This was taken to be an approximately 83% accuracy in identifying the reasons underlying a support request. The accuracy represents an improvement of about 7% in the accuracy that can be achieved through manual identification of support request drivers, as reported by agents following a shared experience such as a support request.

Alternatively, instead of selecting a pre-determined number of communication elements, post-clustering concentration analysis can analyze the subject vectors to identify communication elements that are included in a number of subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is, thus, turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two unit vectors. All the dot products for all vectors in a given subject are added together to provide a weighting quantifier or score for the given subject identifier, which is taken as subject weighting data. A similar analysis can be performed on vectors created through other processing, such as K-means clustering or techniques that generate vectors where each word in the vector is replaced with a probability that the word represents a subject identifier or request driver data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subject identifiers may be substantially different, with some subjects having orders of magnitude fewer subject vectors than other subjects. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content driver software service can also use term frequency-inverse document frequency software processing techniques to vectorize the content data and generating weighting data that weight words or particular subjects. The tf-idf is represented by a statistical value that increases proportionally to the number of times a word appears in the content data. This frequency is offset by the number of separate content data instances that contain the word, which adjusts for the fact that some words appear more frequently in general across multiple shared experiences or content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight by the content driver software service.

The content data can be visualized and subject to a reduction into two-dimensional data using a UMAP to generate a cluster graph visualizing a plurality of clusters. The content driver software service feeds the two dimensional data into a DBSCAN and identify a center of each cluster of the plurality of clusters. The process may, using the two dimensional data from the UMAP and the center of each cluster from the DBSCAN, apply a KNN to identify data points closest to the center of each cluster and shade each of the data points to graphically identify each cluster of the plurality of clusters. The processor may illustrate a graph on the display representative of the data points that are shaded following application of the KNN.

The content driver software service further analyzes the content data through, for example, semantic segmentation to identify attributes of the content data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The content driver software service can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The content driver software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the content driver software service to identify various content sources within the content data. NER techniques are utilized to classify a given word into a category, such as a person, product, organization, or location. Using POS and NER techniques to process the content data allow the content driver software service to identify particular words and text as a noun and as representing a person participating in the discussion (i.e., a content source).

The content driver software service can also perform a sentiment analysis to determine sentiment from the content data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed herein), a lexical co-occurrence network, and bigram word vectors to perform sentiment analysis to improve accuracy of the sentiment analysis.

Polarity-type sentiment analysis (i.e., a polarity analysis) can apply a rule-based software approach that relies on lexicons or lists of positive and negative words and phrases that are assigned a polarity score. For instance, words such as "fast," "great," or "easy" are assigned a polarity score of certain value while other words and phrases such as "failed," "lost," or "rude" are assigned a negative polarity score. The polarity scores for each word within the tokenized, reduced hosted content data are aggregated to determine an overall polarity score and a polarity identifier. The polarity identifier can correlate to a polarity score or polarity score range according to settings predetermined by an enterprise. For instance, a polarity score of +5 to +9 may correlate to a polarity identifier of "positive," and a polarity score of +10 or higher correlates to a polarity identifier of "very positive."

To illustrate a polarity analysis with a simplified example, the words "great" and "fast" might be assigned a positive score of five (+5) while the word "failed" is assigned a score of negative ten (−10) and the word "lost" is assigned a score of negative five (−5). The sentence "The agent failed to act fast" could then be scored as a negative five (−5) reflecting an overall negative polarity score that correlates to a "somewhat negative" polarity indicator. Similarly, the sentence "I lost my debit card, but the agent was great and got me a new card fast" might be scored as a positive five (+5), thereby reflecting a positive sentiment with a positive polarity score and polarity identifier.

The content driver software service can also apply machine learning software to determine sentiment, including use of such techniques to determine both polarity and emotional sentiment. Machine learning techniques also start with a reduction analysis. Words are then transformed into numeric values using vectorization that is accomplished through a bag-of-words model, Word2Vec techniques, or other techniques known to those of skill in the art. Word2Vec, for example, can receive a text input (e.g., a text corpus from a large data source) and generate a data structure (e.g., a vector representation) of each input word as a set of words.

Each word in the set of words is associated with a plurality of attributes. The attributes can also be called features, vectors, components, and feature vectors. For example, the data structure may include features associated with each word in the set of words. Features can include, for example, gender, nationality, etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

For some embodiments, the content driver software service can be configured to determine relationships between and among subject identifiers and sentiment identifiers.

Determining relationships among identifiers can be accomplished through techniques, such as determining how often two identifier terms appear within a certain number of words of each other in a set of content data packets. The higher the frequency of such appearances, the more closely the identifiers would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Various neural networks exist that may be utilized by various AI systems described herein. For instance, an artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is performed.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine-learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
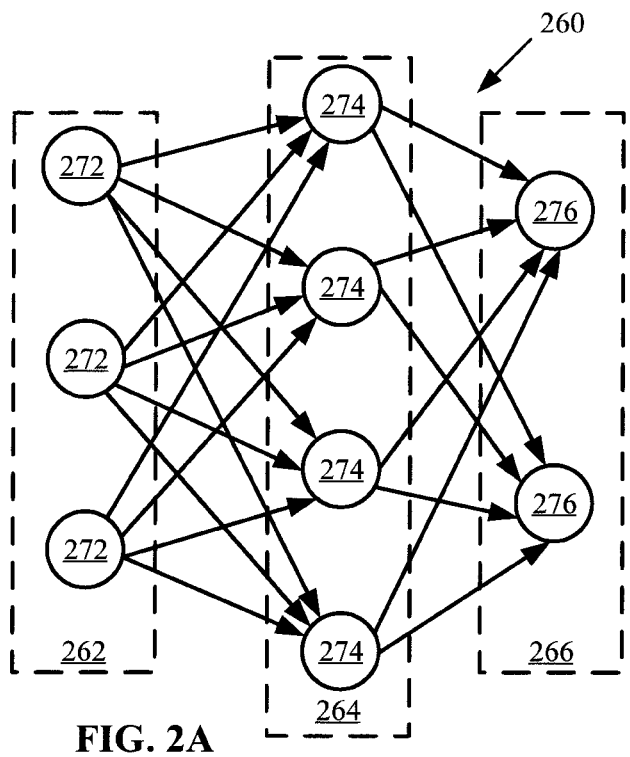
FIG. 2A is a diagram of a feedforward network, according to at least one embodiment, utilized in machine learning.
Figure 2C:
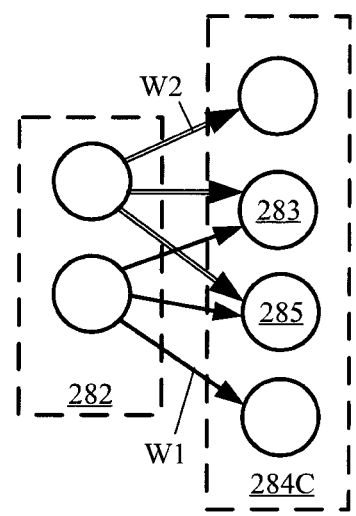
FIG. 2C is a diagram of a portion of the convolution neural network of FIG. 2B, according to at least one embodiment, illustrating assigned weights at connections or neurons.
Figure 2B:
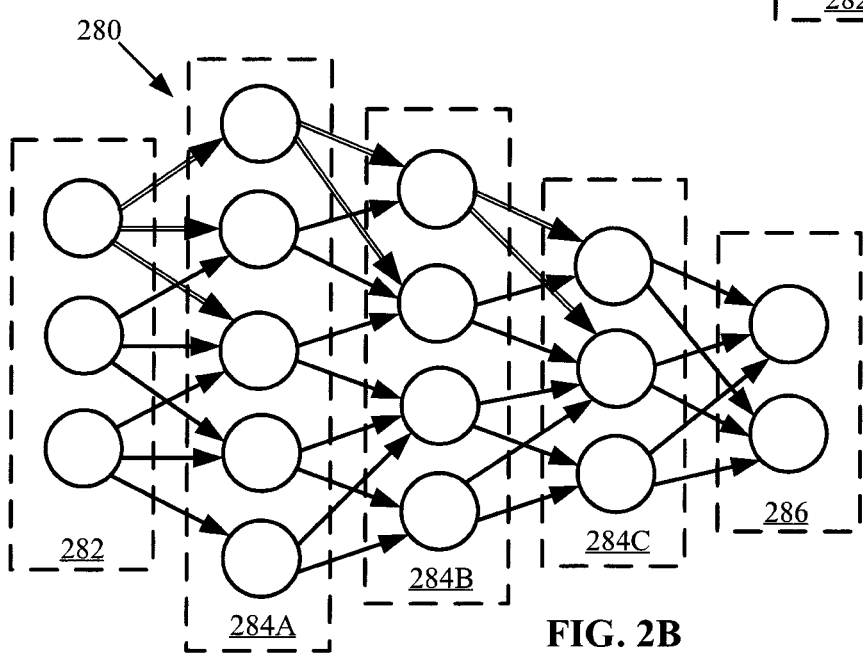
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
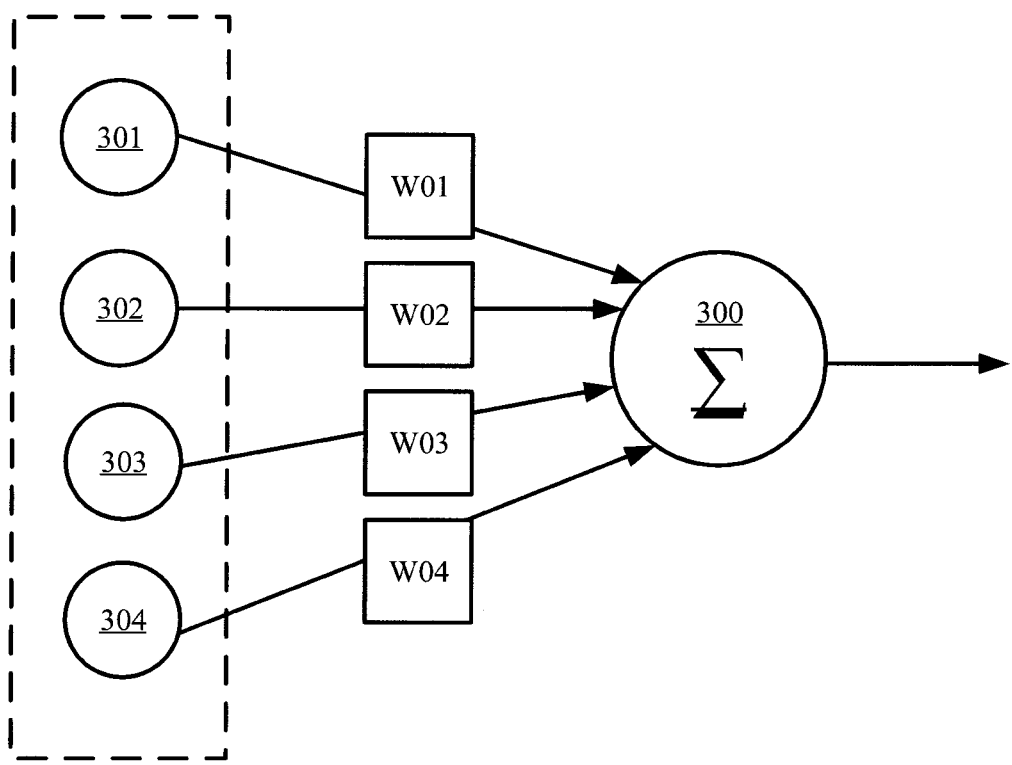
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine-learning program may include a feedback system suitable to provide the connection(s) between subsequent and previous layers of the network.

Figure 4:
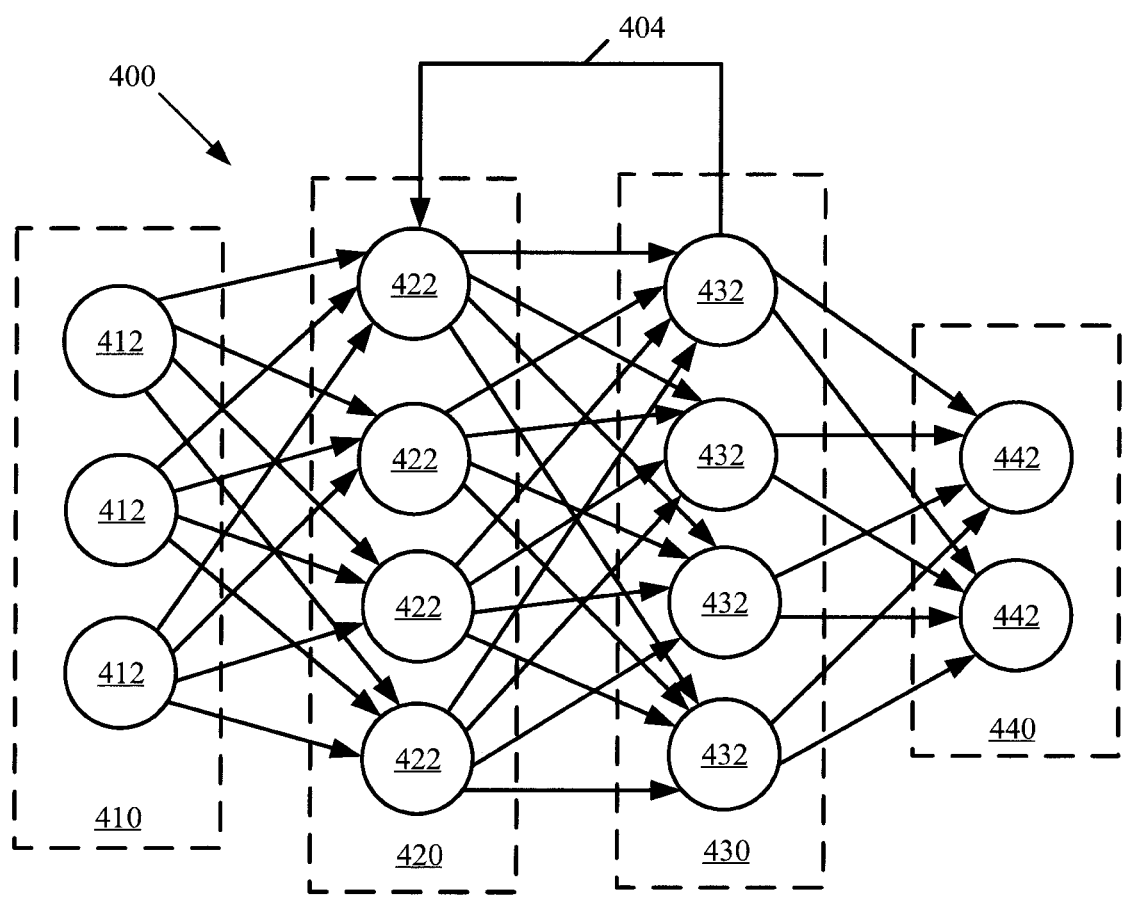
FIG. 4 is a diagram of a Recurrent Neural Network (RNN), according to at least one embodiment, utilized in machine learning.

An example for an RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
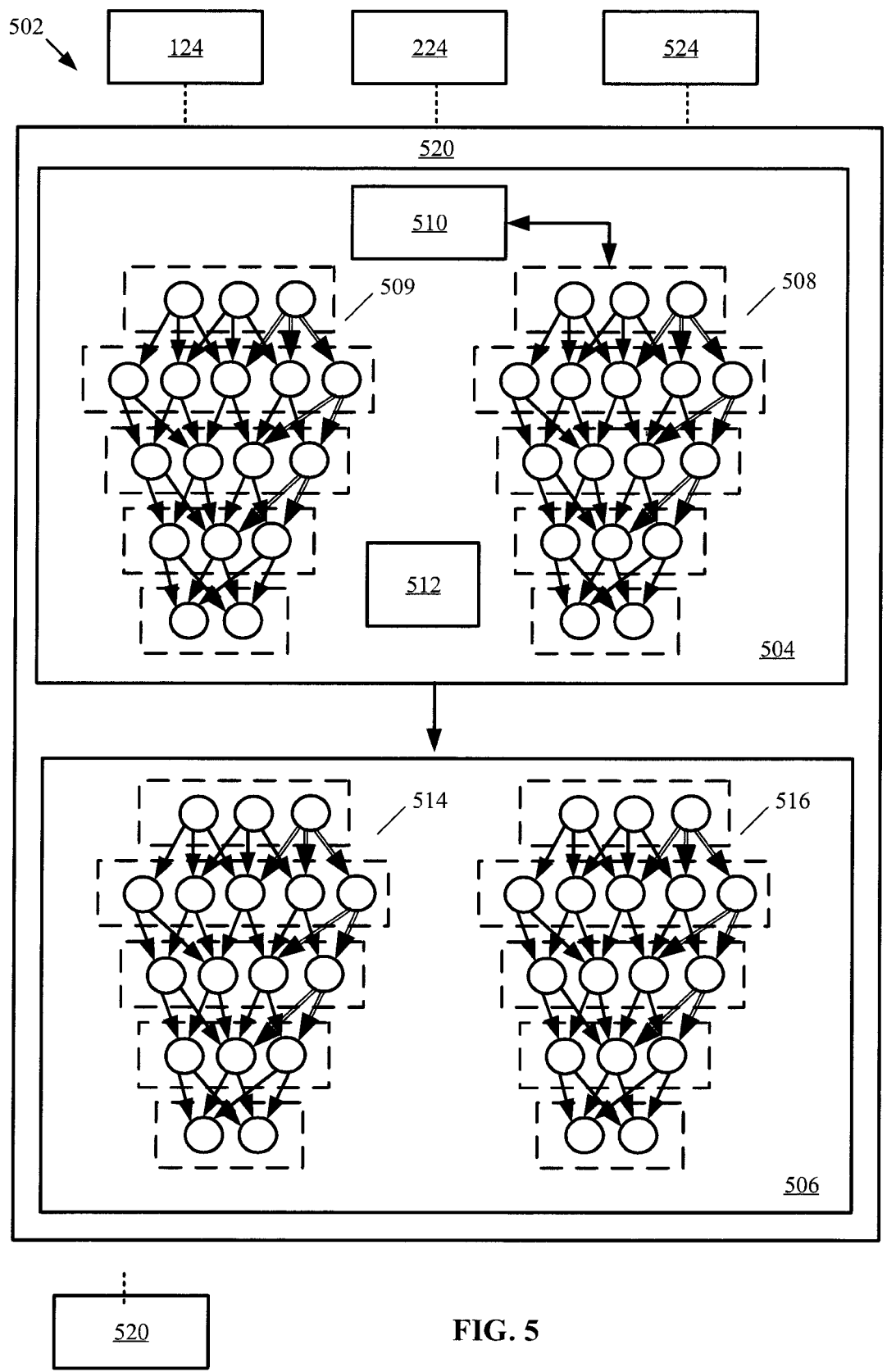
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform preprocessing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, RNNs, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

To implement natural language processing technology, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) Long Short-Term Memory ("LSTM") network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on K-means clustering software processing techniques.

Figure 6:
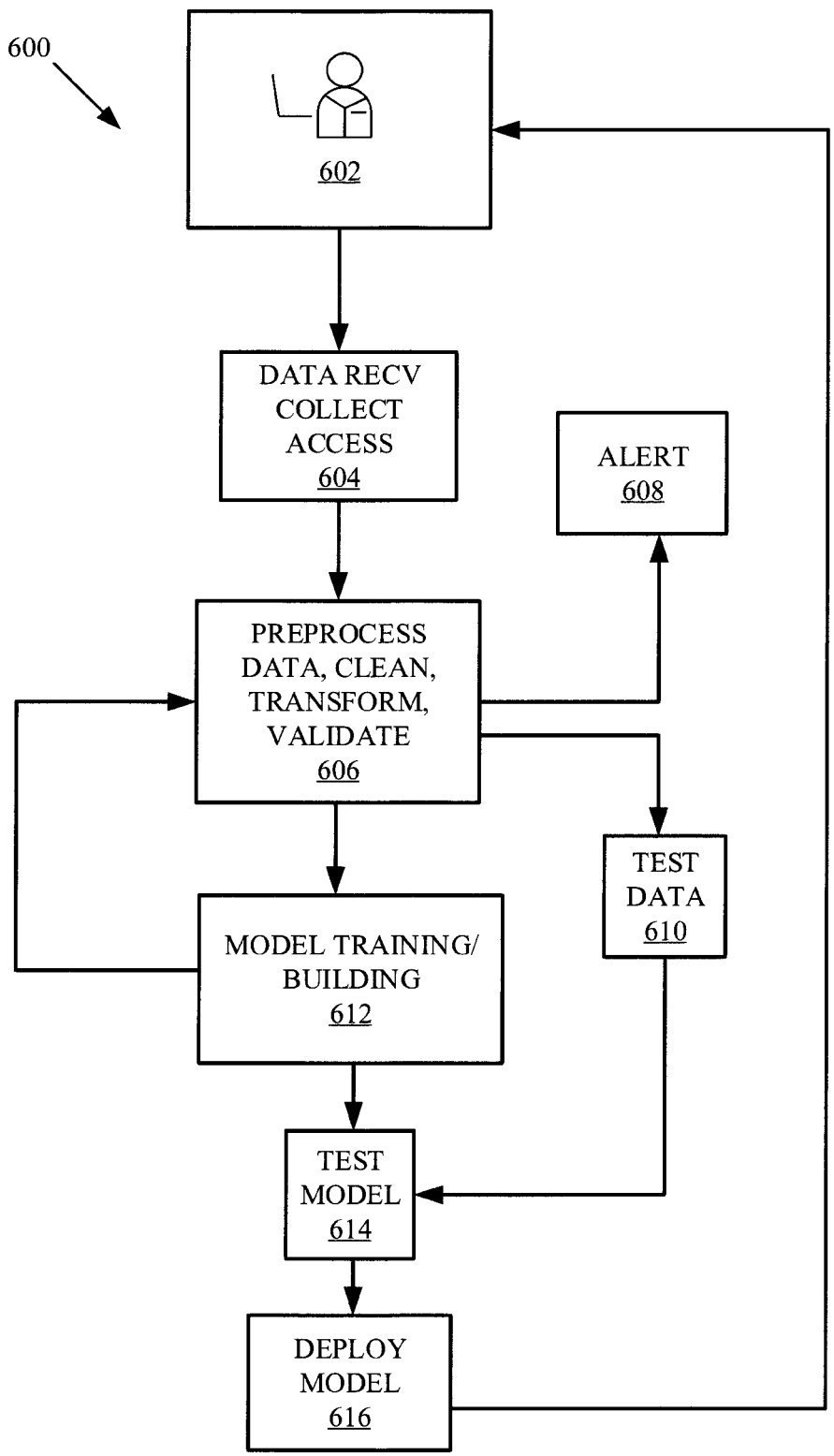
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

NLP techniques or various other textual structuring techniques such as those described herein may be used to process input audio data and/or transcription data. Such data may then be applied to a trained model (including any models described herein) to filter the data and identify pertinent communication elements from the user data and content data including, for example: (a) sequencing data, (b) subject identifier data, (c) weighting data, (d) source identifier data, (e) provider identifier data, (f) user source data, (g) sentiment data, (h) polarity data, (i) resolution data, (j) agent identifier data, and/or (k) other types of data that can be helpful for generating a response within a user interaction. For instance, such data is filtered to determine what information would be relevant for an automated agent to provide information to the user during a user interaction. The data is interpreted when it is applied to the trained model and the data is contextualized.

Once the data is interpreted, NLG systems may then be used in a manner where a document plan is created and a narrative structure may be chosen. Further, textual sentences or portions of sentences are then formulated and combined in ways that accurately represent a summary of the response. Additionally, grammatical rules are then applied to the sentences or portions of sentences in order to generate naturally flowing text. This facilitates generating text that is written or rewritten in a grammatically correct manner with a syntactical structure. According to various embodiments, the final textual output that is generated may incorporate a specific format designed to produce a desired resolution.

Figure 7:
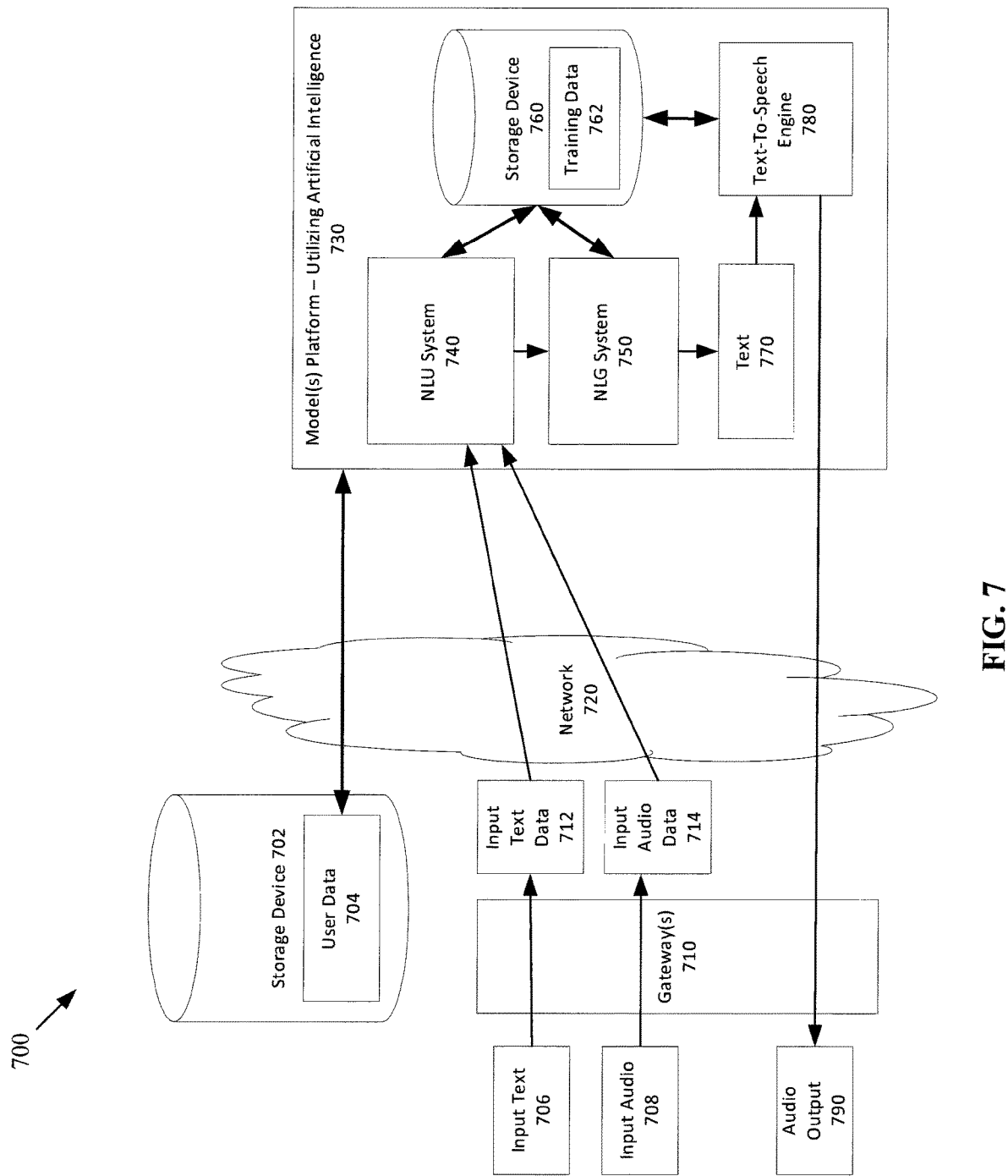
FIG. 7 depicts an example computer system for synthesizing an audio output in response receiving various inputs, in accordance with an embodiment of the present invention.

FIG. 7 depicts an example computer system 700 for synthesizing an audio output 790 in response to receiving various inputs 706, 708, in accordance with an embodiment of the present invention. In certain embodiments, specific communication elements are desired in order to provide a more individualized (e.g., personalized) and contextualized user interaction. Such systems are adaptive and respond to real-time inputs identified via NLP techniques. In these systems, NLP processing utilizes a natural language understanding (NLU) system 740 and a NLG system 750. According to various embodiments, the NLG system 750 is trained similar to the methods used for training the models described herein. According to various embodiments, the same training data 762 may be used to train both the NLU system 740 and the NLG system 750. In other embodiments, different sets of training data may be utilized to train the separate systems. Additionally, the training data 762 may incorporate specific linguistic styles so that the NLG system 750 is trained to produce language that stylistically resembles the training data 762. These specific linguistic styles may incorporate a specific speech patterns such as timbre, tone, cadence, regional dialect, volume, etc.

Advantageously, the disclosed systems and methods that incorporate specific speech patterns including timbre, tone, cadence, regional dialect, volume, and various other specific language styles or conversational elements may enable a user to have a more positive experience with an automated or virtual agent. Often, customers that call a business or other entity seeking assistance may have difficulty relating to or otherwise feeling comfortable in their interactions with automated or virtual agents. From the business entity's perspective, automated or virtual agents can be utilized to provide customers with a desired resolution and eliminate the need for these customers to speak with a human agent. By utilizing virtual agents that provide a more individualized and contextualized user interaction and overall experience, the systems and methods disclosed herein enable business entities to improve resource utilization while improving customer satisfaction and customer retention.

The computer system 700 may include one or more gateways 710 that are configured to receive various forms of information and transfer that information as data across a network 720. According to various embodiments, the information may include, for example, input text 706, and/or input audio 708. The gateway 710 may act as a bridge for secure data transfer that may enable a network to interface with another network with different protocols. In some embodiments, the data gateway converts information, data or other communications from one protocol or format to another. According to some embodiments, the gateway 710 may include hardware or software used in a telecommunication network. For instance, the gateway 710 may include a VoIP gateway that converts input audio 708 to data packets for transmission over the network 720.

When a user initiates a user interaction with the computer system 700, the user may provide various information such as, for example, identifying information (e.g., authentication information such as account number, a phone number, a name, an address, etc.), a user profile, user account information, etc. The identifying information may be received as input text 706 (e.g., selected inputs provided via a mobile device) and/or input audio 708.

In some embodiments, such as those in which a user makes a phone call in order to connect with an individual or automated agent associated with a specific enterprise or business, the enterprise system may prompt the user to provide specific information. In response, the user may speak into the telephonic device and the VOIP gateway 710 converts the input audio 708 to input audio data 714, which is then transmitted across the network 720. In some embodiments, when a user makes a phone call to the specific enterprise or business, the user may provide a typed input or input text 706 (e.g., by pressing a certain number on the telephone that then directs the call to a certain department allows the enterprise to classify a subject of the telephone call). In various embodiments, the input text 706 includes a text message in the form of an SMS transmission that passes through a SMS gateway 710 or in the form of a MMS transmission that passes through a MMS gateway 710 and input text data 712 is communicated across the network 720.

The input audio data 714 and/or input text data 712 may then be compared to stored user data 704 that may be stored in a storage device 702 of the enterprise computer system 700. For instance, the input audio data 714 that is obtained may be compared to stored user data 704 to determine whether the stored user data 704 includes data specific to the user that is providing the input text data 706 and/or input audio data 708. Such user data 704 may indicate, for example, one or more individualized qualities or speech patterns (e.g., a specific timbre) that have produced a desired resolution during previous user interactions with the user. The user data 704 may also include information about the user's financial account (e.g., bank account or loan balance, credit card account, interest rate(s), payment due date(s), minimum payment amount(s), etc.), information about a product account (e.g., utility service account, mobile phone service account, streaming service account, rewards service account, health insurance account, home insurance account, etc.) subscribed to by the user, and/or other organization (e.g., club, group, business, etc.) affiliated with the user.

The network 720 may include any network (e.g., a telecommunications network, cloud-based network, LAN, WLAN, WAN, VPN, etc.) that enables communication between the enterprise computer system 700 and one or more user devices that receive the input text 706 and/or input audio 708 and may include all or a portion of the internet and/or any other communication system or systems at one or more locations.

Once the enterprise computer system 700 receives the input text data 712 and/or input audio data 714 across the network 720, a model platform 730 utilizes artificial intelligence to process the input text data 712 and/or input audio data 714. The model platform 730 creates, trains and deploys machine learning algorithms that emulate logical decision-making. For instance, the model platform 730 may utilize various neural networks such as those described herein. The model platform 730 may train the NLU system 740 through machine learning utilizing training data 762 stored in one or more storage devices such as storage device 760 in order for the NLU system 740 to be fully trained. The NLU system 740 may be configured to parse the text of the input text data 712 and/or input audio data 714 and may perform a reduction analysis (e.g., lemmatization, stemming, tokenization, etc.).

Further, the input text data 712 and/or input audio data 714 may be processed with specific business rules that are deterministically defined based on business goals. For instance, once the input text data 712 and/or input audio data 714 has been interpreted by the NLU system 740, the NLG system 750 may incorporate various considerations into generating text that achieves a communicative goal of the enterprise business. The NLU system 740 may incorporate, according to various embodiments, a confidence/probability score and/or a lattice of hypotheses with each hypothesis corresponding to a confidence/probability score representing the likelihood that words are intended to have a certain meaning/interpretation. According to one embodiment, in order for the NLU system 740 to generate an output to the NLG system 750, the confidence/probability score may need to satisfy or surpass a predetermined confidence threshold. If the NLU system is unable to interpret the words in a manner that satisfies the predetermined confidence threshold, an automated response may request that the user repeat the information provided.

The NLU system 740 may interpret text to derive an intent, context, pertinent pieces of information, emotion, or various other characteristics. According to various embodiments, the NLU system 740 may be used to interpret a current emotional state of the individual, the individual's speech pattern, and/or other environmental or circumstantial factors that may be ascertained or provided by the user.

The NLG system 750 may incorporate various processes or stages including, for example, (i) macro planning—to determine how to structure the entire response (e.g., a document plan), (ii) micro planning—to determine how to phrase sentences within that response/document given the content that achieves the communicative goal, (iii) surface realization—to concatenate the information into coherent and grammatical text, and/or (iv) physical presentation—to incorporate formatting. The NLG system 750 may also be trained using the training data 762 and/or other sets of training data and may apply various learned rules. In one embodiment, the NLG system 750 may be trained to create alternative versions of natural language text and then select one of the alternative versions in real time based on the rules to provide a text output 770.

For instance, as the NLU system 740 processes and interprets the input text data 712 and/or input audio data 714, the NLG system 750 then generates alternative responses to the output (e.g., interpreted data) of the NLU system 740 and probabilistic methods are utilized by the NLG system 750 to generate a text 770 that includes a response predicted to address one or more communication elements of the input text data 712 and/or input audio data 714. In one embodiment, of the user provides information about the purpose of their call, for example, the NLU system 740 may interpret that information and the NLG system 750 may generate text 770 of a response predicted to address the purpose of the call. The NLG system 750 may utilize, according to one embodiment, speech synthesis markup language (SSML) tags to mark up the text 770.

The text 770 may then pass through a text-to-speech (TTS) engine 780 that creates natural sounding speech by transforming the textual data of the text 770 into audio data that is synthesized to resemble human speech. The TTS engine 780 may also be trained using training data 762 and/or other sets of training data to match various conversational characteristics of human speech. In particular, according to one embodiment, the TTS engine 780 may be configured to synthesize audio data that includes a speech pattern (e.g., a prosody element such as timbre, tone, cadence, pitch, volume, pronunciation, speaking rate, articulation, fluency, intensity, inflection, resonance, etc.) predicted to facilitate the optimal outcome. The speech pattern may include aspects of the sound quality that incorporate only one prosody element (e.g., pitch) or more than one prosody element (e.g., pitch, volume, and inflection). In particular, timbre may incorporate the tonal quality that defines a voice and may allow individuals to distinguish between different voices. Individuals may subconsciously respond differently to different timbres. For instance, certain timbres may elicit certain emotions in an individual. Various studies have indicated differences in the neurological responses in the human brain in response to changes in timbre even if the melody itself remains constant (see e.g., Zhang W. et al., *The Effects of Timbre on Neural Responses to Musical Emotion*, 37 MUSIC PERCEPTION 2, 134-146 (2019)). Thus, it is advantageous for businesses that employ automated agents or automated answering services, such as interactive voice response (IVR) services, to incorporate a TTS engine 780 that produces a speech pattern (such as timbre) that is predicted to facilitate an optimal outcome, because the user may subconsciously feel more satisfied with the outcome of the user interaction and have a more favorable opinion of the business.

In various implementations, the TTS engine 780 may be trained to provide different speech patterns depending upon certain user profiles that incorporate, for example, perceived personality types, detected regional dialects, gender (perceived or otherwise ascertained from user data), age range (perceived or otherwise ascertained from user data), etc. In various implementations, the TTS engine 780 may also be trained to provide different speech patterns based on a given topic or purpose for a user interaction (e.g., complaint, inquiry, assistance request, etc.), based on a current emotional state of the individual (e.g., angry, sad, happy, etc.), based on the individual's speech pattern (e.g., speaking fast or slow, speaking loudly or softly, etc.), and/or based on other environmental or circumstantial factors that may be automatically ascertained or potentially provided by the user (e.g., detecting other voices in the background, loud music in the background, detecting that the user is outdoors during the call and has background noise due to weather events, detecting from background noise that the user is in a moving vehicle, correlating telephony or account data to current system outage information furnished by other operational systems etc.).

The TTS engine 780 may include an acoustic model that performs digital signal processing to convert alphanumeric or symbolic linguistic representation into a synthetic acoustic waveform of the text 770 that can be transmitted as an audio output 790 through a computer or other device's speaker or other audio output component. In particular, audio signals incorporate electronic representations of sound waves that are represented digitally as a sequence of numbers, and the TTS engine 780 may utilize different feature representations to label specific aspects of the audio signals. The TTS engine 780 may perform audio signal manipulation by assigning desired audio waveform parameters having individualized and contextualized qualities. The SSML tags are used by the TTS engine to adjust the speech pattern (e.g., a prosody element such as timbre, tone, cadence, pitch, volume, pronunciation, speaking rate, articulation, fluency, intensity, inflection, resonance, etc.). The TTS engine 780 may derive cues from the text 770 (e.g., utilizing SSML tags) regarding various phonemes (e.g., parts of speech) and prosody elements (e.g., timbre, tone, cadence, pitch, volume, pronunciation, speaking rate, articulation, fluency, intensity, inflection, resonance, etc.). In one particular example, an SSML tag that can be used to adjust timbre may change the vocal tract of the speech synthesizer by increasing or decreasing the vocal tract length.

The TTS engine 780 is trained by concatenating training audio data, such as training data 762 and applying algorithms to smooth phonemes and adjust prosody. Further, a trained neural network can predict an optimal audio output 790 based on how user(s) respond to various modifications to phonemes and/or prosody. In particular various rules may be applied by the TTS engine 780 to calculate a score representing a likelihood that a particular user will have a desired response given certain communication elements (e.g., context, speech patterns, purpose for initiating the interaction, etc.). According to various embodiments, recorded speech utterances may be used as training data 762.

The TTS engine 780 may incorporate various techniques in order to synthesize the audio output 790. According to various embodiments, various neural networks, such as RNNs, and/or Hidden Markov Models (HMMs) may be used to determine (e.g., using a maximum likelihood estimation, Gaussian model, or other technique) the probability that aspects of the audio output 790 match the cues provided via the text 770. In one example, various paths representing multiple possible audio matches (e.g., pronunciation) to certain aspects of the text 770 may be represented and a probability that a specific audio match would be optimally suited for the user may be determined based on certain attributes of the user and/or prior responses that the user had in response to providing previous audio outputs. The various paths may be determined based on a confidence level such that the audio output 790 incorporates synthesized speech waveforms having parameters with the highest confidence levels.

In some embodiments, the TTS engine 780 performs this process after processing text 770 from each speech utterance provided by the user in order to adapt in real-time with feedback being provided by the user. Each speech utterance provided by the user may be used to compile a corpus of utterances of the user and generate a user profile. The TTS engine 780 may then generate an audio output 790 that is individualized for the specific user based on the user profile. In particular, the TTS engine 780 may revise and update the speech pattern in response to responses and/or feedback that are added to the user profile, thereby facilitating an optimal outcome for that particular user. According to some embodiments, the TTS engine 780 may incorporate a filter of various synthesized speech qualities including, for example, multiple speech pattern options.

In one non-limiting example, a user may initiate a call where the user is agitated due to being assessed a late fee for not making a payment by a particular due date. The user provides input audio 708 that is converted to input audio data 714 and the model(s) platform 730 of the computer system may access a stored user profile of the user from user data 704. The NLU system 740 interprets the input audio data 714 by, for example, contextualizing or categorizing various communication elements, and transmits the interpreted audio data to the NLG system 750 to generate text 770 that is predicted to provide an optimal outcome by, for example, providing a response that is individualized for that particular user. In this example, the user profile may indicate that for certain contextual categories related to distress or agitation the user has previously responded positively to statements that demonstrate empathy. As a result, the text 770 may incorporate statements that are predicted to provide empathy and comfort to the user such as: "I understand this can be frustrating, I am here to help you." The TTS engine 780 may then generate an audio output 790 that includes the language "I understand this can be frustrating, I am here to help you" and incorporates various prosody elements into a speech pattern predicted to facilitate an optimal outcome for the user. If the user responds to the audio output 790 with increasing agitation by stating, for example, "I want the fee waived!," this new input audio 708 may be interpreted by the NLU system to have an increased agitation level, and the trained NLG system 750 may adapt and adjust with a new response based on predicting that the user may respond better if the speech pattern is altered. Alternatively, if the user provides a new input audio 708 that the NLU system 740 interprets to have reduced agitation such as, for example, "I would like to know if this fee can be waved" then the speech pattern may continue in response to this new speech utterance in an effort to maintain a reduced agitation level. The speech pattern may dynamically change throughout certain portions of the user interaction or throughout the entire user interaction based on changes in the agitation level of the user or changes in various other communication elements. For instance, the NLU system 740 may determine that the user enters a crowded area with a lot of background noise during the call and the speech pattern may be altered to account for the change in the environment. In another instance, the NLU system 740 may determine that the reason the user was late in paying their bill was due to a loss of employment or other unexpected life event where the NLU system 740 detects despair in the user's voice so the speech pattern may change or adapt to detected changes in the user's perceived emotional state in addition to providing, for example, an encouraging audio output 790 response.

Figure 8:
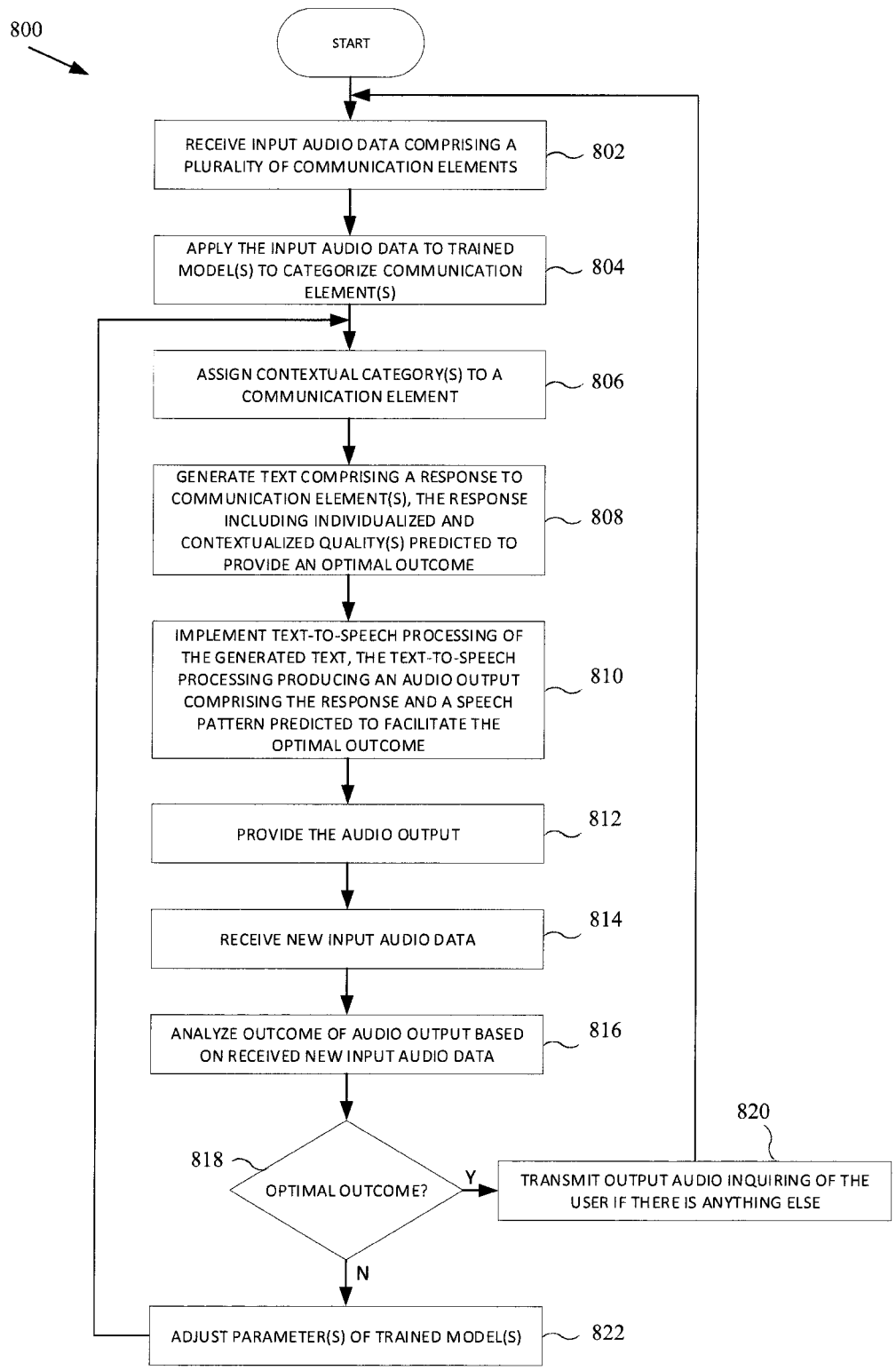
FIG. 8 depicts an example flow process for providing adaptive, individualized and contextualized text-to-speech, in accordance with an embodiment of the present invention.

FIG. 8 depicts an example flow process 800 for providing adaptive, individualized and contextualized text-to-speech, in accordance with an embodiment of the present invention. Initially, in step 802, input audio data is received by a computing system where the input audio data includes a plurality of communication elements. Prior to receipt of the input audio data, the input audio data may have been generated, according to one embodiment, by means of a VoIP gateway that converts audio provided by a user into a digital format. At step 804, the computing system applies the input audio data to one or more trained models to categorize one or more communication elements. For instance, the one or more trained models may include a trained NLU model that interprets and categorizes various communication elements including speech patterns such as phonemes and prosody. The phonemes may represent the segments of words or other basic units of speech and the prosody may include syllables accentuation, intonation, stress, rhythm, timbre, tone, cadence, etc.

At step 806, the computing system may categorize one or more communication elements by assigning at least one contextual category to a communication element. For instance, one communication element that may be categorized includes the speech pattern, and the category may include a regional dialect based on a region of the world/country in which this particular speech pattern is commonly spoken. The speech pattern may also be categorized according to a particular emotional state (e.g., this speech pattern is commonly utilized when a user is happy), gender, age range (e.g. old, young, middle aged, etc.), foreign accent, etc. Another communication element that may be categorized is the content of the speech itself. For instance, the content may be categorized as being an inquiry or a request for assistance, and within those categories there may be subcategories. For example, the inquiry category may have subcategories related to inquiries about user account information, inquiries about product offerings, inquiries about company policies, etc.

At step 808, the computing system (e.g., a trained NLG model of the computing system) generates text that includes a response to one or more communication elements, where the response includes individualized and contextualized qualities that the computing system predicts will provide an optimal outcome to the user. According to one embodiment, the response may include a resolution based on the category (e.g., an inquiry) and the user that is involved in the user interaction. For instance, various users may respond differently to different types of responses, so the response is individualized based on various characteristics of the user. For example, the text may include a longer response if the user is more conversational and does not respond well to one-word answers, or the response may be very short and direct if the user is perceived to be in a hurry or wanting a quick answer. In another example, certain words might be selected that are commonly used in different regions of the world or country that might align with how the user speaks. For instance, the computing system may analyze the verbal inputs provided by the user and may determine that the user speaks similarly to someone from South Boston and individuals from South Boston tend to use specific words that are different from words used by individuals in Milwaukee, Wisconsin.

At step 810, the computing system may implement text-to-speech processing of the generated text to synthesize speech waveforms of an audio output, where the text-to-speech processing may be implemented utilizing, for example, a TTS engine such as that described herein. The audio output includes a response related to the type of input provided by the user (e.g., a response to the inquiry) and a speech pattern that is predicted to facilitate an optimal outcome (e.g., satisfied customer, inquiry resolution, etc.). According to some embodiments, the speech pattern may include at least one prosody element selected from timbre, tone, cadence, pitch, volume, pronunciation, speaking rate, articulation, fluency, intensity, inflection, resonance, etc. or combinations thereof. In some instances, the optimal outcome may be an optimal outcome for the business entity even if this optimal outcome does not necessarily align with the optimal outcome desired by the user. For instance, the optimal outcome desired by the user may be unrealistic (e.g., a request for a $500 gift card for being inconvenienced), but the optimal outcome desired by the business entity may include providing the customer with as much information as possible to help clarify any confusion on company policy in order to provide the user with a greater understanding. In other examples, the optimal outcome may incorporate various concessions on behalf of the company such as a discount on their next purchase. In some cases, predefined concessions may be built into the rules of the various models based on such concessions being predicted to provide a satisfactory resolution to the user while being within an acceptable group of concessions/allowances. In other examples, the computing system may direct a call to a human agent if it is determined that the user is expecting the company to make certain concessions. At step 812, the computing system provides the user with an audio output via, for example, a speaker or other audio output device.

At step 814, new input audio data may be received from the user in response to the computing system providing the audio output and a step 816, the computing system analyzes the outcome that was provided by the audio output based on the new input audio data. For instance, the new input audio data may include an expression of gratitude by the user for having obtained a resolution to their inquiry. In another example, the new input audio data may indicate that the information provided in the audio output did not address the user's inquiry. At step 818, the computing system makes a decision of whether the audio output provided the optimal outcome. If the computing system determines from the new input audio data that the optimal outcome was achieved then at step 820 the computing system may transmit output audio to the user's device inquiring of the user whether there is anything else that the user would like to ask or would like resolved.

Alternatively, at step 818 if it is determined that the audio output did not provide the optimal outcome, then at step 822 the computing system adjusts one or more parameters of one or more trained models and then repeats steps 806, 808, 810 and 812 while incorporating the adjusted parameters into the response provided by the audio output. For instance, the computing system may determine that the response provided did not resolve the inquiry due to, for example, improper categorization of various communication elements. The adjustment at step 822 may re-categorize a certain parameter or communication element so that the response provided may have a higher confidence score and a higher probability of resolving the inquiry.

Figure 9:
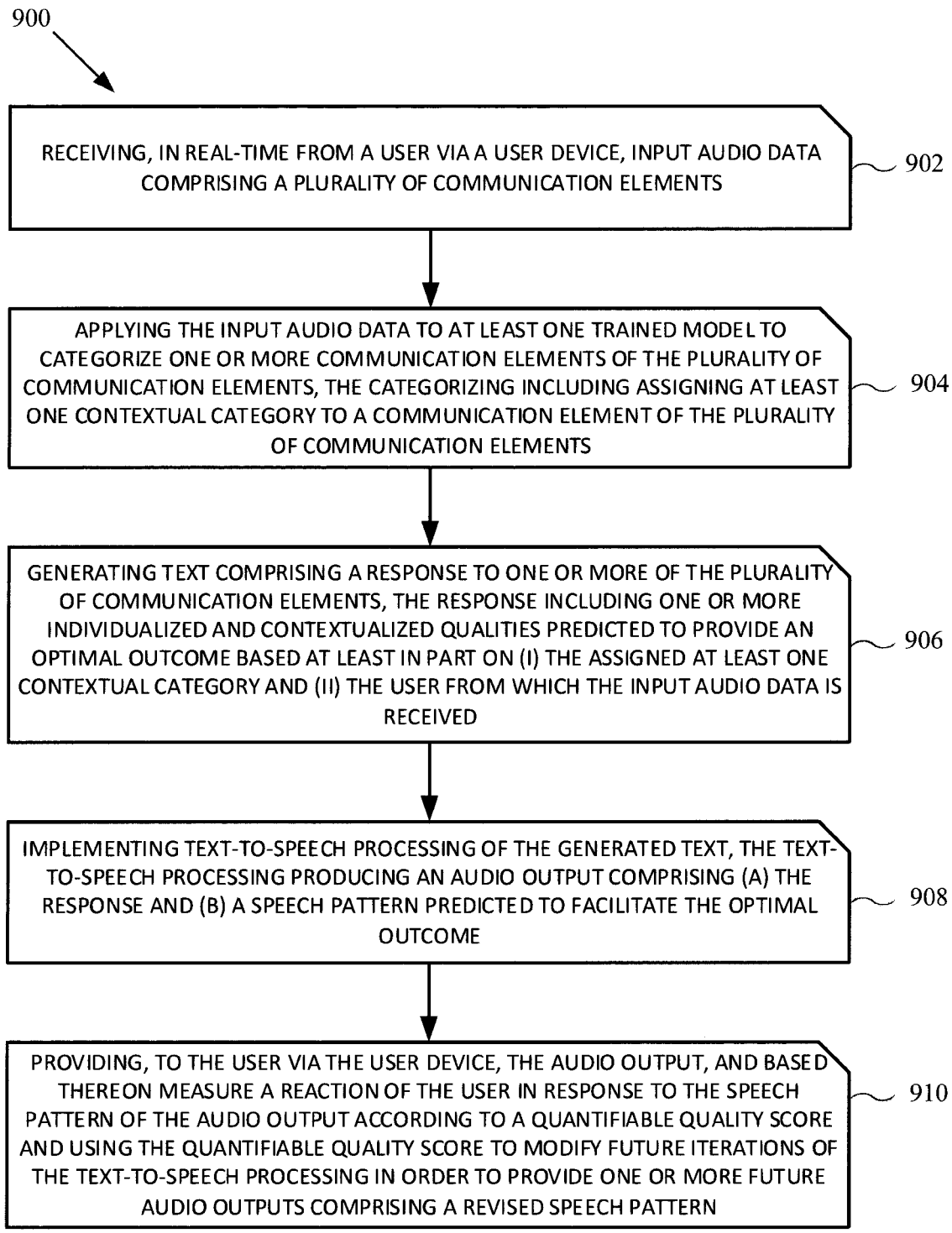
FIG. 9 depicts a block diagram of an example method for adaptive, individualized, and contextualized text-to-speech, in accordance with an embodiment of the present invention.

FIG. 9 depicts a block diagram of an example method 900 for adaptive, individualized, and contextualized text-to-speech, in accordance with an embodiment of the present invention. The method includes, at block 902, receiving, in real-time from a user via a user device (e.g., a mobile phone, smart home device, microphone, etc.), input audio data that includes a plurality of communication elements. According to various embodiments, the user device or the computing system itself may incorporate various gateways to convert raw audio into input audio data. According to various embodiments, the input audio data may be stored to a user profile of the user, where the user profile includes stored user data that includes any prior interaction data of the user that are associated with prior interactions between the user and the computing system.

At block 904, the method includes applying the input audio data to at least one trained model (e.g., a NLU system) to categorize one or more communication elements of the plurality of communication elements, where the categorizing includes assigning at least one contextual category (e.g., type of communication—inquiry/payment/modification, aspects of the communication—regional dialect/emotion/urgency, environment, etc.) to a communication element (e.g., word(s), utterance, speech patterns that include a prosody element such as timbre, tone, cadence, pitch, volume, pronunciation, speaking rate, articulation, fluency, intensity, inflection, resonance, etc.) of the plurality of communication elements.

According to various embodiments, a model (e.g., the NLU system) of the at least one trained model categorizes the at least one communication element of the plurality of communication elements according to an identified speech pattern, where the identified speech pattern includes a regional dialect. Further, according to one embodiment, a speech pattern that is to be included in the response is selected based on the regional dialect.

At block 906, the computing system (e.g., a trained NLG system) generates text that includes a response to one or more of the plurality of communication elements (e.g., a response predicted to be appropriate based on the word(s), utterances, and/or speech pattern(s) that include a prosody element such as timbre, tone, cadence, pitch, volume, pronunciation, speaking rate, articulation, fluency, intensity, inflection, resonance, etc.), where the response includes one or more individualized and contextualized qualities (e.g., word(s), utterances, and/or speech pattern(s) that include a prosody element such as timbre, tone, cadence, pitch, volume, pronunciation, speaking rate, articulation, fluency, intensity, inflection, resonance, etc.) predicted to provide an optimal outcome (e.g., satisfied customer, desired resolution, etc.), where the response is based at least in part on (i) the assigned at least one contextual category, and (ii) the user from which the input audio data is received. For instance, the response may be based on the contextual category indicating that the type of communication is a request for information so the response may include various words or information predicted to resolve the request. Further, the response is also individualized based on the user (e.g., characteristics about the user, information known about the user, a speech pattern of the user, etc.).

According to various embodiments, the computing system performs natural language processing on the input audio data to generate transcribed data. Transcribed data may be the outcome produced when there is a translation between forms of data. For example, input audio data may be converted to a text format. According to one embodiment, the NLP process that is performed incorporates an NLU system that understands and categorizes the input audio data to produce interpreted data that is then processed by an NLG system that generates text (e.g., transcribed data). Additionally, the transcribed data may then be applied to a trained model (e.g., a TTS engine) in order to synthesize the audio output. Additional embodiments may also incorporate a quantifiable quality score into modifying the prosodic configuration of a NLG model that is used to perform the generating of the text, where the prosodic configuration uses the quantifiable quality score to incorporate one or more SSML tags to facilitate producing a revised speech pattern of synthesized audio output.

According to various embodiments, the input audio data may include multiple speech utterances such as, for example, multiple words or multiple sentences. Because the computing system processes such speech utterances in real-time, the computing system may be continually processing the information received via each speech utterance. Thus, as each speech utterance is received, at block 902, each speech utterance is processed at block 904 and 906 until a corpus of speech utterances is developed to provide context to the entirety of the information communicated by the user during a real-time interaction with the user. In certain embodiments, the process of assigning at least one contextual category is adapted after each speech utterance in context with the corpus of multiple speech utterances received thus far during the real-time interaction with the user in order for the text that is being generated to adequately address the entirety of the information that was communicated by the user.

According to various embodiments, when a user profile exists or is created, and when the computing system identifies that user profile, the computing system accesses and analyzes the stored user data that is stored to the user's user profile. Further, if any stored communication elements are identified and are determined by the computing system to contribute to any positive resolutions from the prior interaction data of the user, the computing system may then determine that the identified stored communication elements would contribute to the optimal outcome and as a result incorporates the identified stored communication elements into the response.

At block 908, the computing system implements text-to-speech processing of the generated text (e.g., utilizing a TTS engine), where the text-to-speech processing produces an audio output that includes (a) the response, and (b) a speech pattern. Further, the response and/or the speech pattern included in the audio output is/are predicted to facilitate the optimal outcome.

At block 910, the audio output is provided to the user via the user device and based thereon measure a reaction of the user in response to the speech pattern of the audio output according to a quantifiable quality score and using the quantifiable quality score to modify future iterations of the text-to-speech processing in order to provide one or more future audio outputs comprising a revised speech pattern. According to one embodiment, the computing system detects a pause in the input audio data that is being received in real-time. Once the pause is detected, the computing system may determine whether the user has completed a current stream of speech utterances (e.g., completed their current communication process). If the computing system determines that the user has likely completed the current stream of speech utterances, then the computing system transmits or otherwise provides the synthesized audio output to the user device, which then communicates the audio output via an output communication device (e.g., a speaker) to the user.

According to various embodiments, the audio output also includes a cadence that is predicted to be appeasing to the user in accordance with the assigned at least one contextual category. For instance, based on the communication element being categorized in a certain manner, the models may be trained to apply a cadence to that audio output where the cadence is predicted to be appeasing to the user. In some embodiments, the audio output may also include a tone that is predicted to be appeasing to the user in accordance with the assigned at least one contextual category to which the communication element was assigned.

According to various embodiments, the text-to-speech processing utilizes a deployed text-to-speech model (e.g., such as the TTS engine described herein) and the computing system continuously modifies the prosodic configuration of the deployed text-to-speech model based on receiving future input audio data, providing one or more future audio outputs, and identifying future reactions of the user, with each future reaction of the future reactions having a respective measured quantifiable quality score corresponding to one or more future audio outputs. Further, in one example, the measurement of the user's response compares information provided via a verbal response (e.g., based on a scaled net promotor score (NPS)) from the user to obtain the quantifiable quality score. This quantifiable quality score may be stored to the user profile and incorporated into future iterations of responses that are generated by the computing system at block 906 when the processes of blocks 902, 904, and 906 are repeated. Specifically, according to various embodiments, the quantifiable quality score is further incorporated into future iterations of the implementing the text-to-speech process of block 908 in response to repeating the processes of blocks 902, 904, and 906. Further, the speech pattern may be modified based on the quantifiable quality score being below a desired threshold due to, for example, the customer not responding as positively as was predicted.

According to various embodiments, when a communication process (e.g., a telephone call) is completed, the user may select a prompt to provide customer feedback. The customer feedback that is provided by the user may be stored to a user profile of the user in order to inform and improve future interactions with the user. Thus, according to one embodiment, the user profile may include customer feedback that has been provided by the user. The customer feedback that is provided may indicate, according to one embodiment, what information was provided that contributed to the user having a positive interaction. This information obtained from the customer feedback may be stored in the user profile as stored communication elements that contributed to a positive resolution.

According to various embodiments, when a communication process (e.g., a telephone call) is completed, a human agent may input various notes about the interaction and those notes may be stored to the user profile. In particular, these notes may be included as agent feedback and the user profile may store agent feedback that has been provided by the agent in response to previous communications with the user. In certain examples, the agent feedback may identify stored communication elements (e.g., the response provided, comments made, etc.) that contributed to a positive resolution.

According to various embodiments, the audio output is provided to an external device (e.g., mobile device, telephone, etc.) that is external to the computing system. Thus, the audio output may be transmitted via a telephonic communication means. For instance, a transmitter may convert sound waves of the audio output to electrical signals that may be sent through the telecommunication system to the receiving telephone (i.e., the external device) that then converts the electrical signals to audible sound in the receiver/speaker. In another example, the sound waves of the audio output may be converted to a signal that is transmitted via radio waves to a cell tower that relays the radio wave to a signal receiver of the external device (e.g., a mobile phone), which then converts the signal to sound wave. Further, the input audio data may also be received via a telephonic communication means such that a transmitter of an external device converts input audio that is converted to input audio data to an electrical signal or to radio waves that may be sent through the telecommunication system (e.g., using radio waves transmitted via a cell tower or via telephone cables) to a receiving device of the computing system.

Figure 10:
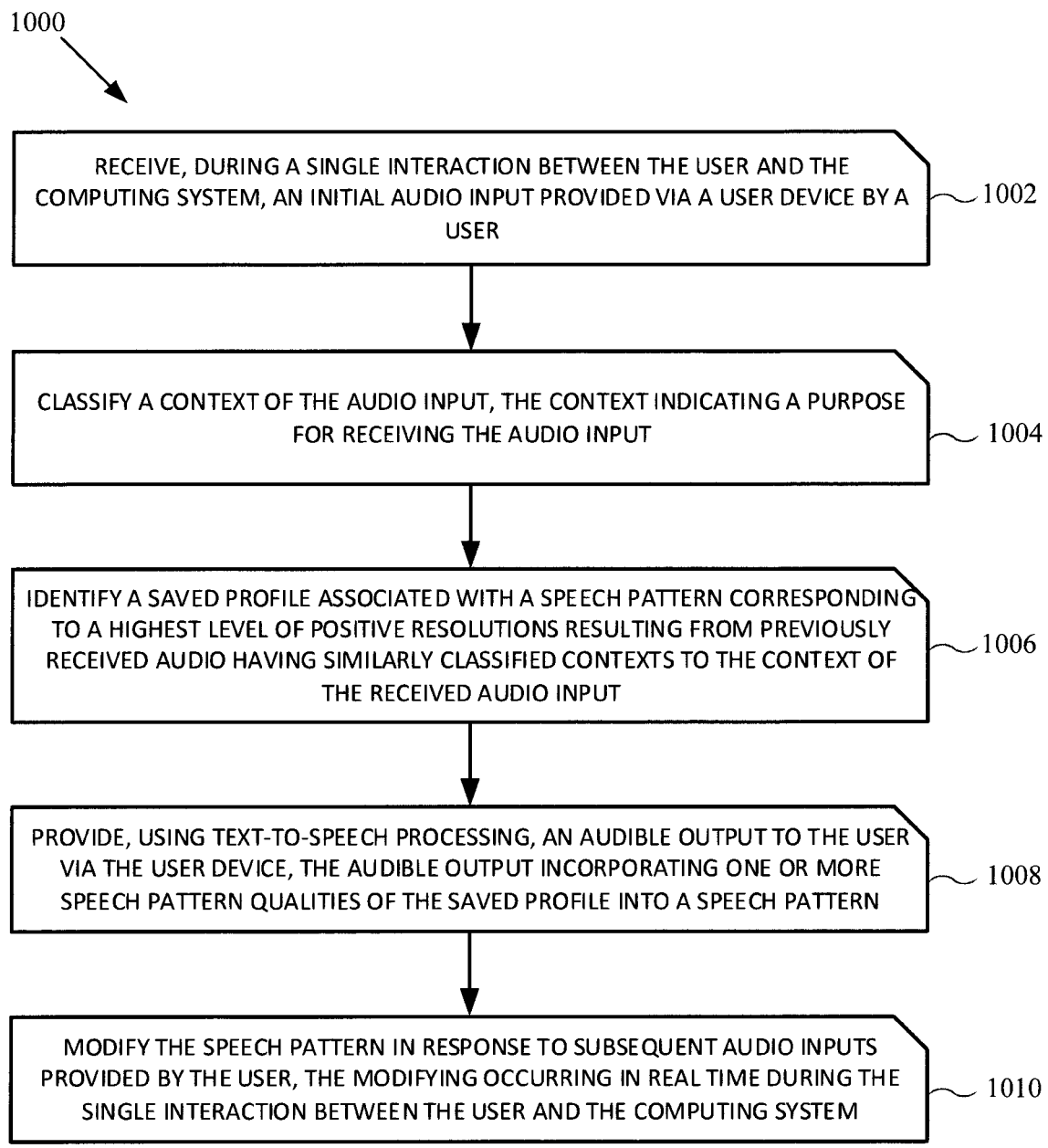
FIG. 10 depicts a block diagram of an example method for adaptive, individualized, and contextualized text-to-speech, in accordance with an embodiment of the present invention.

FIG. 10 depicts a block diagram of an example method 1000 for adaptive, individualized, and contextualized text-to-speech, in accordance with an embodiment of the present invention. At block 1002, an initial audio input (e.g., an utterance, comment, sentence, word, phrase, etc.) that is provided via a user device by a user is received during a single interaction (e.g., single telephone conversation) between the user and the computing system. At block 1004, a context of the audio input is classified, where the context indicates a purpose (e.g., inquiry, comment, request, etc.) for receiving the audio input. According to one embodiment, the context of the audio input is provided by the user based on the user providing an input (e.g., a verbal input, selection of a number of a phone's keypad, a typed input, etc.) indicating a reason/purpose for initiating the single interaction. The process performed at block 1004 may include, for example, a NLU system that processes and interprets the initial audio input.

At block 1006, the computing system identifies a saved profile associated with a speech pattern corresponding to a highest level of positive resolutions resulting from previously received audio having similarly classified contexts to the context of the received audio input. For instance, various speech patterns that utilize one or more prosody elements may be selected from one or more prosody categories. In particular, each speech pattern may incorporate certain audio-based characteristics that are associated with various prosody elements (e.g., timbre, tone, cadence, pitch, volume, pronunciation, speaking rate, articulation, fluency, intensity, inflection, resonance, etc.). Thus, each prosody element may have a prosody category associated therewith such as, for example, a timbre category, tone category, cadence category, etc. Within each category may be various profiles with scores or other values that rank or otherwise quantify certain speech pattern qualities depending on the type of prosody element. For instance, for a timbre category, various timbre options (e.g., high, middle, low, flat, smooth, soft, mellow, warm, breathy, nasal, etc.) may be available. The speech pattern profile scores may associate (e.g., using clustering or various models) these values with certain outcomes for specific interaction purposes (e.g., inquiry, comment, request, complaint, etc.).

According to one embodiment, the saved profile corresponding to the highest level of positive resolutions is identified based on a desired outcome. For instance, if the prosody categories include a timbre category that has one or more saved profiles (e.g., timbre profiles) assigned thereto, each of the saved profiles within the timbre category may have associated scores or weights that correlate with certain responses. In one particular example, the computing may identify a specific profile (e.g., the saved timbre profile) that highly correlates to a desired outcome (e.g., a positive resolution) when utilized in previous interactions for the particular purpose of the current audio input. In one example categorization system, the profile(s) may be contextually classified based on one or more purposes for user interactions between previous users and the computing system. This process described by block 1006 may incorporate various models (e.g., NLG system) and artificial intelligence processes described herein.

At block 1008, the computing system provides, using text-to-speech processing (e.g., via a TTS engine), an audible output that incorporates one or more speech pattern qualities of the speech pattern profile into a speech pattern. Thus, once the profile has been selected by the process performed at block 1006, text-to-speech processing is performed on text that has been generated to respond (i.e., in a manner predicted to address the purpose of the current communication provided via the initial audio input) to the audio input. The text may be generated using various NLP processes described herein and may include one or more indicators on inflection points or other aspects of words that should be emphasized or adjusted in order for the sound of the audio output to incorporate the speech pattern of the saved speech pattern profile.

At block 1010, subsequent audio inputs (e.g., additional utterances, comments, sentences, word, phrases, etc.) are provided by the user and the computing system modifies the speech pattern in response to these subsequent audio inputs. This modification process may occur in real-time during the single interaction between the user and the computing system. For instance, the computing system may modify the speech pattern in response to each subsequent audio input or a grouping of subsequent audio inputs depending on the topic being discussed, certain reactions by the user, additional context ascertained by the computing system, etc.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computing system for adaptive, individualized, and contextualized text-to-speech, the system comprising:
    a memory;
    one or more processors in communication with the memory; and
    program instructions executable by the one or more processors via the memory to:
        iteratively train, using training data, at least one recurrent neural network (RNN) to categorize communication elements from audio data, the RNN being trained to perform natural language processing on the audio data to generate transcribed data from the audio data, parse the generated transcribed data, and perform a reduction analysis on the transcribed data in order to interpret the transcribed data to derive the communication elements for categorization, the communication elements including intent, context, emotion, and other circumstantial factors, the training including:
            inserting the training data into an iterative training and testing loop to predict a target variable; and
            repeatedly predicting the target variable during each iteration of the training and testing loop, wherein each iteration of the training and testing loop has differing weights applied to one or more nodes of the RNN, each of the differing weights being updated with each iteration of the training and testing loop to reduce error in predicting the target variable and improve predictability of the RNN;
        deploy the at least one trained RNN to facilitate categorization of the communication elements;
        receive, in real-time from a user device, input audio data of a user via a telephonic communication means, the input audio data comprising a plurality of communication elements;
        apply the input audio data to the at least one trained RNN to categorize one or more communication elements of the plurality of communication elements, the categorizing including assigning at least one contextual category to a communication element of the plurality of communication elements;
        generate text comprising a response to one or more of the plurality of communication elements, the response including one or more individualized and contextualized qualities predicted to provide an optimal outcome based at least in part on (i) the assigned at least one contextual category and (ii) the user from which the input audio data is received;
        implement text-to-speech processing of the generated text, the text-to-speech processing producing an audio output comprising (a) the response and (b) a speech pattern predicted to facilitate the optimal outcome, the speech pattern including at least one prosody element, the at least one prosody element including a timbre intended to elicit certain emotions of the user associated with a desired outcome, the timbre being based on the at least one contextual category assigned to the communication element of the plurality of communication elements; and
        provide, to the user device, the audio output and based thereon measure a reaction of the user in response to the speech pattern and the timbre of the audio output according to a quantifiable quality score and using the quantifiable quality score to modify future iterations of the text-to-speech processing in order to provide one or more future audio outputs comprising a revised speech pattern.

2. The computing system for adaptive, individualized, and contextualized text-to-speech according to claim 1, wherein the input audio data includes multiple speech utterances and based thereon performing the receiving, performing, and applying after each speech utterance of the multiple speech utterances, and wherein the assigning is adapted after each speech utterance in context with the multiple speech utterances received thus far from the user.

3. The computing system for adaptive, individualized, and contextualized text-to-speech according to claim 1, wherein the program instructions are further executable to detect a pause in the input audio data being received and, based at least in part on the detecting, to determine whether the user has completed a current stream of speech utterances, wherein the providing the audio output is based on the determining that the user has completed the current stream of speech utterances.

4. The computing system for adaptive, individualized, and contextualized text-to-speech according to claim 1, wherein the program instructions are further executable to store the input audio data to a user profile of the user, wherein the user profile comprises stored user data that includes any prior interaction data of the user associated with prior interactions between the user and the computing system.

5. The computing system for adaptive, individualized, and contextualized text-to-speech according to claim 4, wherein the program instructions are further executable to identify an existing user profile of the user and based thereon:
  access and analyze the stored user data;
  identify any stored communication elements that contributed to any positive resolutions from the prior interaction data of the user;
  determine that the identified stored communication elements would contribute to the optimal outcome; and
  incorporate the identified stored communication elements into the response.

6. The computing system for adaptive, individualized, and contextualized text-to-speech according to claim 5, wherein the user profile includes customer feedback provided by the user, the customer feedback identifying the stored communication elements that contributed to a positive resolution.

7. The computing system for adaptive, individualized, and contextualized text-to-speech according to claim 5, wherein the user profile includes agent feedback provided by an agent's previous communication with the user, the agent feedback identifying the stored communication elements that contributed to a positive resolution.

8. The computing system for adaptive, individualized, and contextualized text-to-speech according to claim 1, wherein the at least one prosody element further includes a prosody element selected from the group consisting of tone, cadence, pitch, volume, pronunciation, speaking rate, articulation, fluency, intensity, inflection, and resonance, that is predicted to be appeasing to the user in accordance with the assigned at least one contextual category.

9. The computing system for adaptive, individualized, and contextualized text-to-speech according to claim 1, wherein the timbre selected is predicted to be appeasing to the user.

10. The computing system for adaptive, individualized, and contextualized text-to-speech according to claim 1, wherein the at least one trained RNN categorizes the at least one communication element of the plurality of communication elements according to an identified speech pattern, wherein the identified speech pattern includes a regional dialect and based thereon selecting the speech pattern based on the regional dialect.

11. The computing system for adaptive, individualized, and contextualized text-to-speech according to claim 1, wherein the text-to-speech processing utilizes a deployed text-to-speech model, and wherein the program instructions are further executable to continuously modify a prosodic configuration of the deployed text-to-speech model, based on receiving future input audio data, providing the one or more future audio outputs, and identifying future reactions of the user, with each future reaction of the future reactions having a respective measured quantifiable quality score corresponding to the one or more future audio outputs.

12. The computing system for adaptive, individualized, and contextualized text-to-speech according to claim 1, wherein the quantifiable quality score is further incorporated into modifying a prosodic configuration of the a natural language generation model that is used to perform the generating of the text, the prosodic configuration using the quantifiable quality score to incorporate one or more speech synthesis markup language (SSML) tags to facilitate producing the revised speech pattern.

13. The computing system for adaptive, individualized, and contextualized text-to-speech according to claim 1, wherein the user device comprises an external device that is external to the computing system, and wherein the program instructions are further executable to transmit the audio output via a telephonic communication means.

14. A computing system for adaptive, individualized, and contextualized text-to-speech, the system comprising:
  a memory;
  one or more processors in communication with the memory; and
  program instructions executable by the one or more processors via the memory to:
    iteratively train, using training data, at least recurrent neural network (RNN) to categorize communication elements from audio data, the RNN being trained to perform natural language processing on the audio data to generate transcribed data from the audio data, parse the generated transcribed data, and perform a reduction analysis on the transcribed data in order to interpret the transcribed data to derive the communication elements for categorization, the communication elements including intent, context, emotion, and other circumstantial factors, the training including:
      inserting the training data into an iterative training and testing loop to predict a target variable; and
      repeatedly predicting the target variable during each iteration of the training and testing loop, wherein each iteration of the training and testing loop has differing weights applied to one or more nodes of the RNN, each of the differing weights being updated with each iteration of the training and testing loop to reduce error in predicting the target variable and improve predictability of the RNN;
    deploy the at least one trained RNN to facilitate categorization of the communication elements;
    receive, during a single interaction between the user and the computing system and via a telephonic communication means, an initial audio input provided via a user device by a user;
    classify a context of the audio input, the context indicating a purpose for receiving the audio input;
    identify a saved profile associated with a speech pattern, the saved profile corresponding to a highest level of positive resolutions resulting from previously received audio having similarly classified contexts to the context of the received audio input;
    provide, using text-to-speech processing, an audible output to the user via the user device, the audible output incorporating one or more speech pattern qualities of the saved profile into a speech pattern, the speech pattern qualities including at least one prosody element, the at least one prosody element including a timbre intended to elicit certain emotions of the user associated with a desired outcome, the timbre being based on the context assigned to the audio input; and
    modify the speech pattern in response to subsequent audio inputs provided by the user, the modifying occurring in real time during the single interaction between the user and the computing system.

15. The computing system for adaptive, individualized, and contextualized text-to-speech according to claim 14, wherein the program instructions are further executable to access one or more saved profiles within a prosody category selected from one or more prosody categories, each prosody category being associated with different prosody element, the one or more saved profiles comprising the identified saved profile, and wherein the one or more saved profiles are contextually classified based on one or more purposes for user interactions between users and the computing system.

16. The computing system for adaptive, individualized, and contextualized text-to-speech according to claim 14, wherein the context of the audio input is provided by the user based on the user providing an input indicating a reason for initiating the single interaction.

17. A computer-implemented method for adaptive, individualized, and contextualized text-to-speech, the computer-implemented method comprising:

iteratively training, using training data, at least one recurrent neural network (RNN) to categorize communication elements from audio data, the RNN being trained to perform natural language processing on the audio data to generate transcribed data from the audio data, parse the generated transcribed data, and perform a reduction analysis on the transcribed data in order to interpret the transcribed data to derive the communication elements for categorization, the communication elements including intent, context, emotion, and other circumstantial factors, the training including:

inserting the training data into an iterative training and testing loop to predict a target variable; and repeatedly predicting the target variable during each iteration of the training and testing loop, wherein each iteration of the training and testing loop has differing weights applied to one or more nodes of the RNN, each of the differing weights being updated with each iteration of the training and testing loop to reduce error in predicting the target variable and improve predictability of the RNN;

deploying the at least one trained RNN to facilitate categorization of the communication elements;

receiving, in real-time from a user device, input audio data of a user, the input audio data comprising a plurality of communication elements;

applying the input audio data to the at least one trained RNN to categorize one or more communication elements of the plurality of communication elements, the categorizing including assigning at least one contextual category to a communication element of the plurality of communication elements;

generating text comprising a response to one or more of the plurality of communication elements, the response including one or more individualized and contextualized qualities predicted to provide an optimal outcome based at least in part on (i) the assigned at least one contextual category and (ii) the user from which the input audio data is received;

implementing text-to-speech processing of the generated text, the text-to-speech processing producing an audio output comprising (a) the response and (b) a speech pattern predicted to facilitate the optimal outcome, the speech pattern including at least one prosody element, the at least one prosody element including a timbre intended to elicit certain emotions of the user associated with a desired outcome, the timbre being based on the at least one contextual category assigned to the communication element of the plurality of communication elements; and providing, to the user device, the audio output and based thereon measure a reaction of the user in response to the speech pattern and the timbre of the audio output according to a quantifiable quality score and using the quantifiable quality score to modify future iterations of the text-to-speech processing in order to provide one or more future audio outputs comprising a revised speech pattern.

18. The computer-implemented method for adaptive, individualized, and contextualized text-to-speech according to claim 17, wherein the input audio data includes multiple speech utterances and based thereon performing the receiving, performing, and applying after each speech utterance of the multiple speech utterances, and wherein the assigning is adapted after each speech utterance in context with the multiple speech utterances received thus far from the user.

* * * * *